(12) United States Patent
Spooner et al.

(10) Patent No.: US 12,365,171 B2
(45) Date of Patent: Jul. 22, 2025

(54) MULTI-LAYERED ARTICLE

(71) Applicant: QinetiQ Limited, Farnborough (GB)

(72) Inventors: Christopher Douglas James Spooner, Bracknell (GB); Emma Jane Newton, Farnborough (GB); Robert Nathan Williams, Farnborough (GB); Louisa Alice Laing, Farnborough (GB); Lyn David Jones, Fleet (GB); Lloyd Morris Wye, Farnborough (GB)

(73) Assignee: QINETIQ LIMITED, Farnborough (GB)

( * ) Notice: Subject to any disclaimer, the term of this patent is extended or adjusted under 35 U.S.C. 154(b) by 452 days.

(21) Appl. No.: 17/630,764

(22) PCT Filed: Jul. 28, 2020

(86) PCT No.: PCT/EP2020/071176
§ 371 (c)(1),
(2) Date: Jan. 27, 2022

(87) PCT Pub. No.: WO2021/023555
PCT Pub. Date: Feb. 11, 2021

(65) Prior Publication Data
US 2022/0314590 A1 Oct. 6, 2022

(30) Foreign Application Priority Data
Aug. 5, 2019 (GB) ..................... 1911130

(51) Int. Cl.
*B32B 27/20* (2006.01)
*B32B 5/18* (2006.01)
*B32B 27/06* (2006.01)
*B32B 27/32* (2006.01)

(52) U.S. Cl.
CPC .............. *B32B 27/20* (2013.01); *B32B 5/18* (2013.01); *B32B 27/065* (2013.01); *B32B 27/32* (2013.01); *B32B 2250/05* (2013.01); *B32B 2264/1022* (2020.08); *B32B 2264/4021* (2020.08); *B32B 2307/204* (2013.01)

(58) Field of Classification Search
None
See application file for complete search history.

(56) References Cited

U.S. PATENT DOCUMENTS

| 6,399,903 | B1 * | 6/2002 | Stevenson | G06F 1/182 |
| | | | | 200/305 |
| 6,946,203 | B1 | 9/2005 | Lockhart et al. | |
| 7,754,299 | B2 | 7/2010 | Wu et al. | |
| 9,850,359 | B2 | 12/2017 | Cooper et al. | |
| 2002/0174685 | A1 | 11/2002 | Nonogaki | |
| 2003/0011533 | A1 | 1/2003 | Sakurada et al. | |
| 2003/0027897 | A1 | 2/2003 | Mei et al. | |
| 2004/0029985 | A1 | 2/2004 | Aki et al. | |
| 2005/0105191 | A1 | 5/2005 | Baer et al. | |
| 2006/0165971 | A1 | 7/2006 | Kuroda et al. | |
| 2007/0221939 | A1 | 9/2007 | Taskar et al. | |
| 2008/0191952 | A1 | 8/2008 | Tokoro et al. | |
| 2009/0068402 | A1 | 3/2009 | Yoshida et al. | |
| 2017/0331183 | A1 | 11/2017 | Lenk | |
| 2019/0148836 | A1 | 5/2019 | Hu et al. | |
| 2019/0291364 | A1 * | 9/2019 | O'Connor | B29C 70/58 |

FOREIGN PATENT DOCUMENTS

| KR | 20130048426 A * | 5/2013 |
| WO | 2005/002841 A1 | 1/2005 |
| WO | 2018/226657 A1 | 12/2018 |

OTHER PUBLICATIONS

Kim et al.,KR-20130048426-A, 2013-05-10 (machine translation) (Year: 2013).*
General Plastics, Polyurethane Foam: Dielectric Materials for Use in Radomes and Other Applications, Nov. 3, 2015 <https://www.generalplastics.com/wp-content/uploads/2016/12/White-Paper-PU-Foam-Dielectric-Materials-for-Use-in-Radomes-and-Other_Applications.pdf> (Year: 2015).*
International Searching Authority, International Search Report and Written Opinion mailed on Sep. 25, 2020, issued in connection with International Patent Application No. PCT/EP2020/071176, filed on Jul. 28, 2020, 13 pages.

* cited by examiner

*Primary Examiner* — Cheng Yuan Huang
(74) *Attorney, Agent, or Firm* — MCDONNELL BOEHNEN HULBERT & BERGHOFF LLP

(57) ABSTRACT

Multi-layered articles or products comprising layers of filled polymer compositions, methods of making and applications or uses thereof.

19 Claims, 13 Drawing Sheets

MULTI-LAYERED ARTICLE

The present application is a national stage entry of PCT/EP2020/071176 filed on Jul. 28, 2020, which claims priority to Great Britain Patent Application No. 1911130.1 filed Aug. 5, 2019, the contents of each of which are hereby incorporated by reference.

FIELD OF THE INVENTION

The present invention relates to multi-layered articles or products comprising layers of filled polymer compositions, methods of making and applications or uses thereof.

BACKGROUND OF THE INVENTION

It is known to incorporate filler material with polymers. However, incorporating filler material into polymer compositions (particularly high levels of filler material) and retaining desirable properties of the polymer remains a challenge.

One application in which filled polymers are used is in so called Radio Frequency (RF) products. RF products are generally taken to mean devices or products which operate in the radio wave region of the electromagnetic spectrum, with wavelengths longer than infrared light. They have frequencies from about 3 KHz to 300 GHz, and corresponding wavelengths from about 100 km to about 1 mm. Examples of RF products include multi-layer products such as radomes, RF lenses (e.g. a Luneburg lens).

Certain applications may require the various layers (or parts) forming the products, e.g. lenses, to possess different material properties. For example, being able to control the material permittivity versus position in the volume of the article would be desirable for many RF products. The product or article may therefore comprise a number of layers (or parts) of varying chemical constitution and/or shape which typically may be made separately.

Polymers may be filled with filler materials (particulate or fibrous) in order to tailor the properties of the polymer or simply in an attempt to use filler material in order to save on the use of polymer which tends to be more expensive than filler material. In these circumstances, it is desirable if the filled polymer exhibits at least broadly comparable properties to the unfilled polymer and preferably improved properties.

In order to use filled polymers in certain applications it is required to make very precise shapes and sizes and therefore it is desirable if the filled polymer is easy to work with and may be used in existing techniques (preferably which are economically viable) for preparing shaped articles comprising filled polymers.

Further, there is a need to be able to make materials or products with certain properties, including those discussed above, using cost effective techniques which allow for high throughput. Examples of such products include the aforementioned RF products, shaped products in general, multi-layer products, lens structures and the like. Injection moulding is an example of a relatively low cost scalable technique for making the various parts of a product, including products for which the requirements are quite stringent.

Providing a filled polymer possessing certain properties, for example, a high dielectric constant (dk) or permittivity, (or more specifically the relative real permittivity), while at the same time retaining good rheology properties such as viscosity has hitherto proven difficult. The present inventors have found that, inter alia, some of the afore-mentioned problems may be addressed by the combination of surface treated filler material (e.g. a coated filler material), and, optionally, other additives such as lubricants when used in polymer compositions. The present inventors have also found that said polymer compositions are particularly useful in preparing multi-layered products including those already referred to herein and which possess a range of desirable properties and may be made efficiently.

Providing a polymer with lower values of dielectric constant or permittivity may also be desirable for use in, for example, a multi-layered article or product. However, the present inventors have found that providing a foamed shaped polymer wherein at least some of the properties of the polymer are non-variant or substantially non-variant across the entire, or across substantially the entire, volume of a foamed polymer can be problematic. This may particularly be the case when the polymer is processed during certain additive techniques such as injection moulding, as opposed to subtractive techniques such as machining shapes from a larger sheet of foam which has significantly higher cost implications.

The manufacture of shaped (filled) polymer parts to a high level of precision also presents a number of other challenges, particularly when thick sections are required by the part geometry. Further, these thick section parts may form a part of a larger assembly of parts to form a complex shaped article or product, and the product function may require maintenance of desired properties at the interface between parts and in the main body thereof. It may not necessarily be possible to redesign functional components of this nature to allow for easier manufacture, as the geometry is critical to the function and changes to geometry may deleteriously affect the product function.

Such a level of precision may be required in preparing various shaped articles, including the RF products, e.g. lenses, as referred to above.

Though injection moulding is a low cost scalable technique which is suitable for making the various parts of a product such as a lens, the parts, which may be made from injection moulding, are typically limited in section thickness. This is mainly due to the thermal conductivity of polymers and the shrinkage of thermoplastic polymers on solidification and cooling from the melt processing temperature back down to room temperature.

Typically, the various parts or layers making up a multi-layered product may require to be chemically bonded and preferably over the whole surface area of the sections representing the interface(s) between different parts or layers. By forming a good chemical bond across the entire interface, certain performance aspects of the part, such as mechanical properties or function, may be improved. The presence of unwanted or unexpected air voids in an RF product, for example, would be expected to adversely affect electrical performance. In addition, degradation of such a product which is not whole surface bonded will occur over time, resulting in the separation of adjoining layers or gas (typically air) and/or moisture ingress into any voids which may be present.

Injection moulded parts are typically assembled to form a (multi-layered) shaped article or product by polymer welding techniques such as ultrasonic welding or vibrational welding. In these techniques, energy is directed to the bondline by frictional heating under a clamping force which melts a thin interfacial layer of the part or parts which are typically made from thermoplastic polymers. This allows the polymer to flow and polymer chains of the different parts at the interface to form a chemical bond of high strength. However, it is difficult to provide whole surface bonds using these techniques, i.e. a bond which covers the entire area of the interface formed between different parts. Both ultrasonic welding and vibrational welding require energy intensifier features to be designed into the initial part moulding. These intensifiers melt and flow during welding which can lead to difficulties controlling geometrical tolerances of the interface between the layers and may lead to voids, un-bonded areas and flash if the flow is not carefully controlled. Furthermore, multi-layer complex shaped geometries for functional products such as lenses are not always suitable for use in connection with these techniques and cannot easily be re-designed to accommodate such assembly processes without affecting the function of the part. For example, some parts for use in a lens are too thin for ultrasonic welding, the instant energy of which would damage the part. Further, some parts are the wrong shape to allow energy dispersion in an even manner, are too thick to allow transmission of the energy through the part to the bondline, or are made from soft polymers such as polyolefins which may dampen the energy.

A vibration technique known as spin welding is ideal for radially symmetric parts such as lenses but requires chuck features (e.g. holes or protrusions) to grip the parts to allow one part to be rotated relative to the other and these can disrupt the design geometry of the product and limit the number of layers which can be bonded (leaving holes or protrusions which affect the bondline of the next layer). Laser welding, which requires a transparent surface to be bonded to an absorbing surface, is not possible when seeking to bond parts comprising opaque and/or functional fillers. The presence of functional fillers also increases the melt viscosity and therefore makes it difficult to facilitate adequate material flow in the bondline to provide good adhesive strength.

Over-moulding and/or multi-shot moulding are other known techniques for assembling injection moulded parts. In these techniques, each new layer is injection moulded over the previous moulded layer in a progressively larger mould cavity. These techniques have a number of disadvantages. Moulding a molten polymer over a solidified part of a similar polymer will cause the first part to partially melt. This may deform the geometry at the interface between the two parts, particularly opposite the gate of the injection moulding tool where pressures and temperatures are highest. Polymers of progressively reducing melt temperatures can be used but this limits the number of layers possible. This problem is exacerbated when functional, environmental, or mechanical requirements limit the available polymer choices for use in a functional device. There may not be a sufficient range of polymer families available to meet the desired requirements. This represents a challenge of particular significance for RF products such as lenses, when polymers with low loss tangents are often required to minimise energy loss or absorption of RF energy propagating through the structure. Often, very few polymers are available commercially which meet the low loss requirements. Further, mechanical locking features typically need to be designed into the interface layer of the solidified part(s) to ensure they remain connected during service and these features can disrupt the geometry of the functional product. The tooling required for over-moulding and multi-shot moulding techniques tends to be more complex, difficult to design and expensive than conventional single-shot injection mould tooling. The manufacture of articles by multi-shot moulding is regarded as a specialist process often requiring bespoke equipment for one product design and its use represents a significant barrier to market entry for a given product. It is difficult to compensate for shrinkage with multi-shot moulding and this leads to further difficulties in compensating for shrinkage to control geometry of the final shaped article or product. Shrinkage can also lead to residual stresses and warpage. In multi-shot tools, the ability to mould more than one identical part in a single machine cycle is limited when compared to single shot moulding. This limits the economies of scale possible.

As mentioned above, certain applications may require the various layers forming the products or lenses to possess different material properties, e.g. being able to control the permittivity is desirable for many RF products. The product or article may therefore comprise a number of layers of varying chemical constitution and/or shape which must be made separately. The parts may be complex in shape, e.g. comprising parts of constantly varying section thickness and/or doubly curved surfaces, and a low cost manufacturing process may be required to manufacture the product in large volume and economically and, at the same time, retain a good quality bond between the layers which does not deleteriously affect the material properties of the product.

SUMMARY OF THE INVENTION

It is an object of the present invention to overcome at least some of the afore-mentioned problems and, inter alia, to provide multi-layered articles or products comprising layers of filled polymer compositions which are suitable for use in a wide range of applications including in multi-layer lens structures. In addition, the present inventors have identified that it would be desirable to provide a range of materials or structures that are able to operate across a broad temperature range, e.g. about −60° C. to about +90° C. (or more specifically about −55° C. to about +80° C.) without a significant deviation occurring with other material properties such as the dielectric constant or permittivity (e.g. the relative real permittivity). In addition, said materials or structures should preferably be resistant to the vibration and shock resulting from changes in the pressure exerted on said materials.

In a first aspect there is provided a multi-layered article or product comprising at least two layers, wherein at least one of the layers is a polymer composition comprising a polymer and a filler material, wherein the filler material comprises titanium dioxide ($TiO_2$) and the polymer is selected from any one or more of: high density polyethylene (HDPE), cyclic olefin copolymer (COC), polyphenylene ether (PPE), polypropylene (PP), and fluorinated ethylene propylene (FEP).

In the first aspect of the invention the filler material is loaded in the polymer. The at least two layers are typically in contact with one another.

The multi-layered article or product may be referred to herein as the shaped multi-layered article or shaped multi-layered product or simply the shaped article or shaped product.

The multi-layered article may be a multi-layer functional product, a multi-layered RF product, for example a lens or an RF lens (such as a Luneburg lens). The multi-layered article may be a multi-layered stack structure such as a multi-layered stack (RF) lens structure.

Each of the layers in the multi-layered article or product may be chosen independently of each other. Typically, each of the layers in the multi-layered article possesses different material properties, for example, the dielectric constant (dk)

or permittivity, (or more specifically the relative real permittivity) may be different for each layer constituting the multi-layered article.

The layers constituting the article or product may be made using cost effective techniques such as moulding techniques, e.g. injection moulding.

In order to achieve the desired range of material properties, the layers may be filled with varying amounts of filler material. In order to achieve desired higher levels of filler material, the present inventors have found that it is advantageous to surface treat the filler material. However, it is a particular advantage of the present invention that these higher levels of loading may be achieved while at the same time retaining good handling or working properties to the extent that said layers may still be formed into complex shapes.

In forming the multi-layered product, the present inventors have invented a method for designing said product and a method for combining the various layers (or parts) of the multi-layered product.

As such, and in a second aspect, there is provided a method of forming a shaped multi-layered article wherein said article comprises at least two parts which are chemically bonded, the method comprising:

assembling at least two non chemically bonded parts in a cavity of a tool to form an assembly of the at least two parts, wherein said cavity is adapted to receive the assembly of at least two parts in the form of the shaped multi-layered article; sealing the cavity of the tool;

melting the assembly of at least two parts to chemically bond the at least two parts together to form the shaped multi-layered article.

By chemically bonded is meant the at least two parts may be bonded by covalent or molecular bonds. Any reference to a chemical bond disclosed herein includes a chemical or molecular bond. The chemical bonding may comprise or consist of covalent or molecular bonds. Therefore, the present invention provides a method of forming a shaped multi-layered article wherein said article comprises at least two parts which are covalently or molecularly bonded, the method comprising:

assembling at least two parts, which are not covalently or molecularly bonded, in a cavity of a tool to form an assembly of the at least two parts, wherein said cavity is adapted to receive the assembly of at least two parts in the form of the shaped article; sealing the cavity of the tool;

melting the assembly of at least two parts to covalently or molecularly bond the at least two parts together to form the shaped article.

The at least two parts may be the at least two layers referred to in accordance with the first aspect of the present invention.

As mentioned above, the manufacture of shaped polymer parts to a high level of precision presents a number of challenges, particularly when thick sections are required by the part geometry. The present inventors have also addressed this problem.

As such, and in a third aspect, the present invention provides a method of making a shaped article comprising at least two parts which are joined, the method comprising: creating a design of said shaped article and defining a split line on said design (or comprises defining a split line on a design of a shaped article), wherein said split line divides the shaped article to provide at least a first part and a second part;

wherein said first part comprises at least one projection;
wherein said second part comprises at least one recess;

preparing said first part and said second part in a moulding process;

joining the prepared first part and the prepared second part together by engaging the at least one projection with the at least one recess.

The moulding process is preferably an injection moulding process.

As such and in a fourth aspect there is provided a method of making a shaped article comprising at least two parts which are joined, the method comprising:

creating a design of said shaped article and defining a split line on said design (or comprises defining a split line on a design of a shaped article), wherein said split line divides the shaped article to provide at least a first part and a second part;

wherein said first part comprises at least one projection;
wherein said second part comprises at least one recess;
preparing said first part and said second part in an injection moulding process; joining the prepared first part and the prepared second part by engaging the at least one projection with the at least one recess.

The at least two parts may be the at least two layers referred to in accordance with the first aspect of the present invention.

The split line is preferably a single continuous split line.

In the at least two parts, the at least one projection may possess a thickness which is greater than two times less than the section thickness of the original (design) part. In the at least two parts, the at least one projection may possess a thickness of less than about 4 mm. In the at least two parts, all of the section thicknesses present are preferably less than 4 mm.

The multi-layered product in accordance with the present invention may comprise any number of layers. For example, there may be up to 10 layers or up to about 100 layers or greater than 100 layers.

One or more than one of the layers in the multi-layered article or product may be a polymer foam. The present inventors have found that the use of a polymer foam layer is useful in tailoring the material properties of a given layer, particularly where a lower value for dielectric constant or permittivity may be required.

As such in a fifth aspect, there is provided a multi-layered article or product comprising at least two layers, wherein at least one of the layers is a polymer composition comprising a polymer and a filler material, wherein the filler material comprises titanium dioxide ($TiO_2$) and the polymer is selected from any one or more of: high density polyethylene (HDPE), cyclic olefin copolymer (COC), polyphenylene ether (PPE), polypropylene (PP), and fluorinated ethylene propylene (FEP) and the second layer is a foamed polymer layer.

The present inventors have also provided herein a method for making improved polymer foams and improved polymer foams per se. The foamed polymer for use in the present invention comprises a number of voids which are distributed across the entirety of the polymer. The present invention thus provides shaped articles or layers comprising foamed polymer wherein the polymer does not comprise a polymer skin, i.e. the voids are distributed throughout the entirety of the polymer. In addition, the present invention seeks to provide a method of forming a shaped foamed polymer article or layer (and the shaped foamed polymer article or layer per se) wherein one or more properties are non-variant throughout the volume of the article in its entirety, or of a part making up the article which can be identified as a constituent and a distinct part (for example, one layer in a multi-layered structure of said article). Such a property may be the dielectric constant or complex permittivity or more specifically the relative real permittivity. By non-variant it may be taken to mean that the mean value of the property in question (e.g. permittivity) may vary between a range of 0 to 5% over a volume scale suitable to take the mean of said property (i.e. one tenth of wavelength scale, or a large enough number of void cells), including all values in between 0% and 5%, preferably up to 2% or up to or less than 0.5%). Preferably, the property does not vary (i.e. by 0%) at any point where the article or part thereof (e.g. layer) is measured compared to any other point on the article or part thereof.

Accordingly, in a sixth aspect, there is provided a method of forming a shaped foamed polymer article from a polymer composition, said polymer composition comprising a polymer and a foaming agent, and wherein the method comprises:

(a) heating the polymer composition to a temperature at or above the melting temperature of the polymer composition;

(b) forming the shaped foamed polymer article from the heated polymer composition; and wherein the polymer composition is maintained at a temperature to prevent the polymer composition freezing during formation of the shaped foamed polymer article.

Following the completed formation of the shaped article it may be cooled, for example to room temperature (e.g. about 20° C.). In the sixth aspect of the invention, (a) and (b) may be referred to herein as step (a) and step (b) and step (a) is performed prior to step (b). The method may comprise or consist of steps (a) and step (b). The cooling may be referred to as step (c).

In the sixth aspect of the invention the polymer article may be a polymer layer and is suitable for use in the multi-layered article or product in accordance with the present invention (including in the first aspect).

In a seventh aspect, there is provided a shaped foamed polymer article obtainable from a method in accordance with the sixth aspect of the present invention. The shaped foamed polymer article comprises or consists of a foamed polymer. The shaped foamed polymer article may be characterised by the absence of a polymer skin. A polymer skin is a part of the foamed polymer which does not comprise any voids or significantly fewer voids when compared to the rest of the shaped foamed polymer article and is located on at least one surface of the polymer article. This absence of a polymer skin provides a foamed polymer where the variance of one or more properties across the entire volume of the foamed polymer is decreased when compared with conventional foamed polymers not made in accordance with the present invention. By non-variant may be taken to mean that the property (e.g. permittivity) does not vary (i.e. by about 0% to about 5%, or up to about 2%, or up to or less than 0.5%) at any point where the article or part thereof is measured compared to any other point on the article or part thereof. The property may be non variant on account of the density of the article or part thereof not varying. The shaped foamed polymer article (e.g. layer) in accordance with the present invention, or a part thereof, may possess an intrinsic dielectric constant (dk), (or real relative permittivity), of less than about 2.0 (for example about 1.5) and, optionally, a low loss tangent of less than about 0.002.

The multi-layered article or product may also comprise a layer of filled polymer composition wherein the layer comprises a polymer and a filler material wherein the filler material is other than $TiO_2$.

The range of dielectric constant (or real relative permittivity) across the multi-layered article or product may be about 1 to about 20, for example from about 1.5 to about 16. For example, the values of dielectric constant may get sequentially progressively larger or smaller for each layer. Each of the layers may possess a different value of dielectric constant. For example, in a spherical or hemi-spherical Luneburg lens, (or essentially spherical or essentially hemi-spherical Luneburg lens), the dielectric constant may be greatest at the centre and get progressively smaller towards the outer layer, wherein the outer layer possesses the smallest value of dielectric constant or permittivity. The outer layer may be a polymer foam in accordance with the present invention.

The shaped article made in accordance with the sixth and seventh aspects of the present invention may be formed in an injection moulding technique. In (b), the shaped foamed polymer article may be formed in a shaped tool cavity. The tool cavity may comprise a moving part or moving tool part such as a movable plate or movable back plate. By moving the tool part the volume of the cavity is adjusted, i.e. either increased or decreased as appropriate. The shaped tool cavity may be referred to herein as the cavity or tool cavity.

The shaped article may be in the form of a layer suitable for use in the various aspects of the present invention.

It will be appreciated that the various aspects (and associated embodiments) of the present invention may be combined.

The multi-layered article or product in accordance with the first aspect may further comprise a layer of polymer foam in accordance with the seventh aspect of the present invention. There may be one or more than one layer of polymer foam. There may be present one or more than one layer of the polymer composition referred to in the first aspect of the present invention. Optionally, there may also be present a layer of polymer composition which comprises a polymer and a filler material wherein the material is other than $TiO_2$. Hence the multi-layered article or product may comprise (i) a layer of polymer composition comprising a polymer and a filler material, wherein the filler material comprises, consists of, or consists essentially of titanium dioxide ($TiO_2$) and the polymer is selected from any one or more of: high density polyethylene (HDPE), cyclic olefin copolymer (COC), polyphenylene ether (PPE), polypropylene (PP), and fluorinated ethylene propylene (FEP), (ii) a layer of polymer foam, (iii) a layer of polymer composition comprising a polymer and a filler material wherein the filler material is other than $TiO_2$.

The layers in the multi-layer article or product may each possess a different dielectric constant or permittivity. The multi-layered article or product may possess up to any number of layers, for example greater than one hundred layers, or up to one hundred layers, or up to ten layers. Any number of the layers may be a polymer composition in accordance with the first aspect of the invention (and optionally associated embodiments).

The more than one layer of the shaped article (or the various layers) may be welded together or formed in accordance with the second aspect of the present invention (and optionally associated embodiments).

The shaped article may be made in accordance with the third or fourth aspects of the present invention (and optionally associated embodiments).

The various aspects of the present invention are well suited for and may tend to focus on the manufacture of and provision of RF products (which may require layers possessing different permittivity and permeability) such as radomes, RF lenses (for example Luneburg lenses or beam forming lenses).

The various aspects in accordance with the present invention allow, inter alia, for the manufacture of multi-layered structures possessing a combination of thick cross section, complex shaped, and varying (or tailored) material properties in separate layers. In accordance with the present invention, this may require the addition of functional fillers of varying amounts to achieve the desired material properties. An example which may incorporate a combination of the various aspects of the invention is a beam forming lens (e.g. a Luneburg lens). The present inventors have found that an RF lens which possesses the maximum angular gain may typically require a number of complex shaped layers of varying permittivity. The various layers preferably need to be manufactured in a cost effective manner and to the required quality, and bonded in such a manner in order to ensure mechanical ruggedness of the structure and no or minimal air gaps. Preferably, the structure provides at least adequate lens function over the required operating conditions and is capable of being manufactured in large numbers economically. The present invention provides, inter alia, polymer formulations with high filler loadings of filler of intrinsically high permittivity, mouldable polymer foam possessing an homogeneous structure, part splitting methodologies, assembly methods to chemically bond all the parts and layers into a (monolithic) structure and post processing treatments (e.g. e-beam cross linking) to increase the service temperature range of the chosen materials.

BRIEF DESCRIPTION OF THE DRAWINGS

This and other aspects of the present invention will now be described in more detail, with reference to the appended drawing(s) showing embodiments(s) of the invention.

DETAILED DESCRIPTION OF THE INVENTION

Figure 1A:
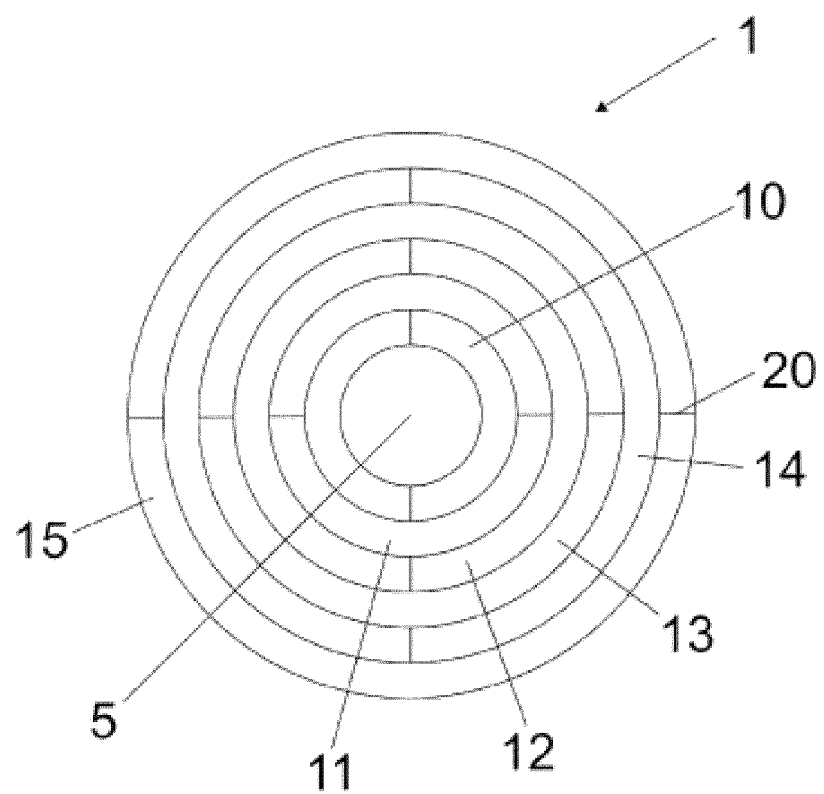
FIG. 1a shows a shaped article in the form of a multi-layered article or product made in accordance with the present invention in the form of a Luneburg lens.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The Shaped Article and Multi-Layered Article/Product

The layers making up the multi-layered article may be formed using a moulding technique such as injection moulding. The multi-layered article or a single layer may be referred to herein as a shaped article. The shaped article may be in the form of: a multi-layered article or product, a multi-layered functional product, a multi-layered RF product, for example a lens or an RF lens (such as a Luneburg lens).

The boundaries between at least two layers may be diffuse or not distinct in so far as the layers may diffuse into each other. These boundary layers may be referred to herein as diffuse layer boundaries. The use of diffuse layer boundaries may be used in providing graded structures.

The compositions in accordance with the present invention are suitable for forming beam forming lens, for example for frequencies from about 12 to 40 GHz, and corresponding wavelengths from about 25 mm to 7.5 mm.

The composition and methods in accordance with the present invention are also well suited for preparing complex, irregular and/or doubly curved shapes of varying section thickness.

The shaped article may be a functional product filled with filler constituents to allow it to carry out a function, such as dielectric fillers to influence RF energy for an RF product.

For example, the shaped article may be a lens, e.g. a multi-layered lens, e.g. a beamforming lens, e.g. a Luneburg lens. The lens may comprise or consist of curved layers. At least one, or any combination, of the layers may be doubly curved. Each of the layers may possess a different permittivity or loss tangent.

The shaped articles formed in accordance with the method of the invention may be suitable for use in RF applications such as; RF lenses (e.g. a Luneburg lens).

The shaped article in accordance with the present invention may be a multi-layer structure or a multi-part structure. At least two of the layers or parts constituting the multi-layered or multi-part structure may each possess different material properties. For example, each part may possess at least one of a different dielectric constant (permittivity). The value of the permittivity of the material properties of different parts may be controlled by varying, independently of each other, one or any combination of polymer, filler, coating or surface treatment agent, additives (e.g. lubricant), and relative amounts thereof.

The at least two layers or parts may be in the form of layers. Any number of the parts may be curved, e.g. doubly curved. By a doubly curved surface is meant a surface which has its radius in simultaneously two planes. Spheres and hemispheres are examples of doubly-curved surfaces. All of the layers in the shaped article may be curved, e.g. doubly curved. Each of the layers may possess different material properties, such as permittivity. This represents a particular advantage of the present invention. Despite the incorporation of high levels of treated filler materials, and optionally other additives, the compositions may still be readily worked by retaining, for example, good rheology properties and formed into complex shapes.

Injection moulding is a manufacturing process for producing parts by injecting molten material into a mould. Material for the part is typically fed into a heated container (e.g. a barrel), mixed (typically using a helical shaped screw) and injected or forced into a mould cavity where it cools and hardens to the configuration of the cavity. The mould may be made from metal such as steel or aluminium and precision machined to form the features of the desired part. Injection moulding is ideal for producing high volumes of the same object. Aluminium moulds are less well suited for high volume production or for parts with narrow dimensional tolerances as they tend to have inferior mechanical properties and are more prone to wear, damage and deformation during the injection and clamping cycles. However, aluminium moulds are cost effective in low volume applications as mould fabrication costs and time are considerably reduced. Many steel moulds are designed to process well over a million parts during their lifetime though tend to be more expensive.

Typically, injection moulding uses a ram or screw-type plunger to force molten plastic material under high pressure into a mould cavity. This solidifies into a shape that has conformed to the contour of the mould. Injection moulding is suitable for processing both thermoplastic and thermosetting polymers. Thermoplastics are highly suitable for injection moulding such is the ease with which they may be recycled, their versatility allowing them to be used in a wide variety of applications, and their ability to soften and flow upon heating. Moulds may be of a single cavity or multiple cavities.

When thermoplastics are moulded, typically, pelletized raw material is fed through a hopper into a heated barrel with a reciprocating screw. Upon entrance to the barrel, the temperature increases and the viscosity is reduced enabling the polymer to flow with the driving force of the injection unit. The screw delivers the raw material forward, mixes and homogenises the thermal and viscous distributions of the polymer, and reduces the required heating time by mechanically shearing the material and adding a significant amount of frictional heating to the polymer. The material feeds forward through a check valve and collects at the front of the screw into a volume known as a shot. A shot is the volume of material that is used to fill the mould cavity and provides a cushion to transfer pressure from the screw to the mould cavity. When enough material has gathered, the material may be forced at high pressure and velocity into the part forming cavity. To prevent spikes in pressure, the process typically uses a transfer position corresponding to a 95-98% by volume full cavity where the screw shifts from a constant velocity to a constant pressure control. Often, injection times are well under one second. Once the screw reaches the transfer position the packing pressure is applied until the gate or cavity entrance solidify. Due to its small size, the gate is normally the first place to solidify through its entire thickness. Once the gate solidifies, no more material can enter the cavity and accordingly the screw reciprocates and acquires material for the next cycle while the material within the mould cools so that it can be ejected and be dimensionally stable. Once the required temperature has been achieved, the mould opens and an array of pins, sleeves, strippers are driven forward to demould or release the article. Then the mould closes and the process is repeated.

Injection moulding is advantageous over other moulding techniques for a variety of reasons, including a lower cycle time, geometrical precision, and improved process control.

(Host) Polymer

The polymer composition comprises, inter alia, a polymer which may be referred to herein as the host polymer. The (host) polymer is a thermoplastic polymer. The thermoplastic polymer may be selected from one or more of a number of polymers, namely high density polyethylene (HDPE), cyclic olefin copolymer (COC), polyphenylene ether (PPE), polypropylene (PP), and fluorinated ethylene propylene (FEP). Any of the polymers mentioned herein for use in the present invention may be a homopolymer or a copolymer. The polymer may be in the form of a resin. The term resin may be taken to mean a polymer material, either solid or liquid, prior to its shaping in to the shaped article.

The host polymer may be crosslinked after formation of the shaped article. This may be referred to herein as a post-production step. Preferably, crosslinking is carried out using electron beam crosslinking. Typically, crosslinking may be achieved by irradiating the polymer composition or shaped article between about 21 kiloGrays (kGy) and about 300 kiloGrays, preferably between about 120 kGy and about 240 kGy, most preferably at least about 147 kGy. Preferably, a fully assembled and final product would be treated in this manner rather than individual or constituent parts or layers thereof. Advantageously, cross-linking of the polymer may increase the service temperature and heat deflection temperature of the post-assembled multi-layered article whilst still allowing the thermoplastic properties (i.e. re-melting) to be used during assembly of the article. By service temperature is meant the temperature at which the polymer is used in a particular application. An alternative term for service temperature is operating temperature.

PP or HDPE is preferred for use in the present invention, and even more preferably it is preferred if the HDPE is cross-linked. Crosslinking the HDPE results in the operational temperature range being broadened.

HDPE has extremely low levels of chain branching allowing it to solidify with high levels of crystallinity and it typically possesses a density of 0.941-0.965 g/cm$^3$. A typical mean molecular weight for HDPE is <50,000. HDPE is particularly preferred for use in the present invention. HDPE may be crosslinked to form crosslinked HDPE. Crosslinking the polymer results in the operational temperature range being broadened.

A typical density for PP is 0.900-0.910 g/cm$^3$ and a typical mean molecular weight is <350,000.

Filler Material

The filler material is selected from titanium dioxide which may be untreated or surface treated (e.g. coated) to form a surface treated (e.g. coated) titanium dioxide. The filler material may comprise, consist of, or consist essentially of surface treated titanium dioxide. The filler material may comprise, consist of, or consist essentially of coated titanium dioxide.

Relative to the total dry volume of the filled polymer, the filler material, (or surface treated, e.g. coated titanium dioxide) may be present in an amount of at least about 0.1 vol %, or at least about 5 vol %, or at least about 10 vol %, or at least about 15 vol %, or at least about 20 vol %, or at least about 30 vol %, or at least about 40 vol %, or at least about 50 vol %, or at least about 60 vol %, or at least about 65 vol %, or at least about 70 vol %. The filler material may be present up to about 75 vol %, or up to about 70 vol %. Relative to the total dry volume of the filled polymer, the coated filler material may be present in an amount of at least about 15 vol % to about 75 vol %, or at least about 20 vol % to about 75 vol %, or at least about 30 vol % to about 75 vol %, or at least about 40 vol % to about 75 vol %, or at least about 45 vol % to about 75 vol %, or at least about 50 vol % to about 75 vol % or at least about 60 vol % to about 75 vol %. The upper limit for all of these ranges may be up to about 75 vol % or up to about 70 vol %. The amount of filler material present in the polymer is measured based on the total volume of the dry components of the filled polymer. With respect to the relative amounts present herein, reference to the filler material may be to the filler material itself or to the surface treated (e.g. coated) or non surface treated titanium dioxide.

The titanium dioxide may be surface treated with a coating agent or a surface treatment agent. The coating or surface treatment agent may be present in an amount of about 0.5 wt % to about 10 wt %, preferably about 0.7 wt % to about 5 wt %, most preferably about 0.9 wt % to about 2 wt % based on the surface treated (e.g. coated) weight of the surface treated or coated titanium dioxide. The titanium dioxide may be partially coated or partially surface treated with a silane or the titanium dioxide may be completely coated or completely surface treated with a silane. The titanium dioxide may be surface treated over some or all of its surface. The titanium dioxide may be partially coated or completely coated. When the titanium dioxide is partially coated or partially treated there may be one or more distinct areas of the surface of the titanium dioxide which remain uncoated or untreated.

The titanium dioxide may be surface treated or coated with a coupling agent or a dispersant. The titanium dioxide may be surface treated or coated with any one or more of; a silane (for example an organosilane), The coating agent or surface treatment agent may be a silane, (for example an organosilane). The titanium dioxide may be partially coated or partially surface treated with a silane or the titanium dioxide may be completely coated or completely surface treated with a silane.

The silane may be selected from any silane that will assist in improving the flowability of the filler material and the dispersion of the filler material in the polymer. The silane may make the filler surface hydrophobic, i.e. the presence of the silane will make the filler surface more hydrophobic than the filler in the absence of the silane. By making the filler surface hydrophobic or more hydrophobic in character then the filler will disperse less well in water. The silane may be an organosilane. Typical examples of silanes which may be used in any aspect or embodiment of the present invention include methacryl silanes, for example, a methacryloxy functional trimethoxy silane such as (gamma)-methacryloxypropyltrimethoxy silane. The titanium dioxide may be surface treated (e.g. coated) by combining a surface treatment or coating agent and filler material or titanium dioxide in the presence of an acidic environment (e.g. in a solution). The filler material or titanium dioxide and surface treatment or coating agent may all be combined with said acidic solution and mixed or sprayed and heated. Any excess solvent may be evaporated off following coating and the surface treated (e.g. coated) filler cured at an appropriate temperature. Typical curing temperatures may be of the order of about 120° C. Typical curing times may be of the order of about 1 hour.

The filler material or the titanium dioxide may be present in the form of particles in one or more of a range of shapes, for example, plate shaped particles, spherical particles, irregular shaped particles, flakes. Preferably, the filler material or titanium dioxide is of a high purity grade, for example greater than about 95 wt % pure, or greater than about 96 wt % pure, or greater than about 97 wt % pure, or greater than about 98 wt % pure. The filler material or titanium dioxide may possess a particle size ranging from about 1 nm, or from about 0.1 μm, or from about 0.5 μm, or from about 1 μm to about 200 μm. The filler material or titanium dioxide may possess a particle size ranging from about 1 nm to about 0.1 μm, or from about 1 nm to about 0.5 μm, or from about 1 nm to about 1 μm. The filler material or titanium dioxide may possess a particle size ranging from about 0.1 μm to about 0.5 μm, or from about 0.1 μm to about 1 μm, or from about 0.1 μm to about 200 μm. The filler material or titanium dioxide may be present in multimodal, for example, bimodal form.

Compounding

The host polymer may be filled by methods in which a filler material (typically present in particulate form) and a polymer resin are mixed together in suitable ratios to form a blend (so-called "compounding"). Typically, the filler material is surface treated or coated prior to compounding with the polymer. The present inventors have found that one of the challenges with the compounding recipe is to incorporate the required volume fraction (Vf) of (particulate) filler material (which may be referred to herein as "filler Vf"), whilst maintaining appropriate melt rheology to allow suitable flow for subsequent moulding processing (e.g. injection moulding) and to provide adequate mechanical and environmental properties for the finished parts. Polymer resins of high Melt Flow Rate (MFR) are useful for providing high filler Vf. Suitable grades of PP may possess the desired MFR. HDPE is preferred. Melt flow rates of at least about 100 g per 10 min, or at least about 200 g per 10 min are preferred, however lower flow rates are also suitable such as at least 20 g per 10 min, for example in connection with the use of HDPE. MFR is measured at the melt processing temperature of the polymer. For example, this is typically at about 190° C. for HDPE and typically at about 230° C. for PP.

Broadly, the method of forming the polymer composition may comprise: surface treating (e.g. coating) of the filler material (as an additional optional step); blending of filler material and polymer (and optionally other additives such as a lubricant), compounding of the blend, optionally pelletizing the compounded filled polymer composition. The filler material may comprise titanium dioxide wherein the surface thereof has been treated and untreated titanium dioxide.

The polymer resin may be in a form (e.g. liquid form) to enable the filler material to be dispersed therein. Where the polymer resins are solid at ambient temperatures, the polymer resin may need to be melted before the compounding can be accomplished. In some embodiments, the filler material may be dry blended with particles of the polymer resin.

The polymer resin, the filler material comprising, or consisting of, or consisting essentially of the (surface treated (e.g. coated)) titanium dioxide, and if necessary, any other optional additives such as one or more lubricants, may be formed into a suitable masterbatch by the use of a suitable compounder/mixer in a manner known per se. The masterbatch may be pelletized, e.g. by the use of a single screw extruder or a twin-screw extruder which forms strands which may be cut or broken into pellets. The compounder may have a single inlet for introducing the filler and the polymer resin together and any other constituents. Alternatively, separate inlets may be provided for the filler material and the polymer resin plus any other necessary constituents. Suitable compounders are available commercially, for example from Coperion (formerly Werner & Pfleiderer). Preferably, the polymer composition in accordance with the present invention is prepared prior to injection moulding.

Typically for a twin screw extruder process, temperatures across the barrel will be set between about 120° C. (in the vicinity of the extruder head) and about 240° C. (in the vicinity of the feed end). Typically, the rotation rate is about 200-350 rpm and the hopper feed speed is about 0.8 m/s.

Other materials may be incorporated in the blend. For example, pre-treatment of filler material using surface modifiers, such as organosilane, assist the filler flow in the compounding hopper, and/or polymer wet-out, and/or deagglomeration and/or a reduction in melt viscosity.

Preferably, lubricating waxes are used in an amount ranging from about 0.5% to about 7% by volume based on the total weight of the polymer composition. The lubricant (e.g. wax) is preferably chosen to be compatible with the host polymer. An example of a suitable lubricating wax is a polyolefin (e.g. polyethylene) waxes (selected from polar and non-polar).

The lubricant can be an external lubricant, for example to prevent damage to the composition or the processing equipment such as moulds. The lubricant can be an internal lubricant acting to improve processability of the polymer or polymer composition. The processability of the polymer (composition) may be improved through one or more of an improvement in melt flow (typically an increase), viscosity (e.g. lowered), and heat dissipation (e.g. increased) of the polymer (composition). Polyolefin wax, amide wax and montan ester type waxes are preferred lubricants, most preferably the waxes are matched to the host polymer system, for example polyethylene waxes for use with polyethylene host polymers.

The drop point temperature range for the lubricant (according to ASTM D3954) may be about 90° C. to about 150° C., preferably from about 100° C. to about 130° C., most preferably from about 100° C. to about 118° C.

FIG. 1*a* is a schematic (cross-sectional) representation of a Luneburg lens made in accordance with the present invention. The Luneburg lens (1) example shown comprises a central core (5) surrounded by six shells (10-15). There may be fewer or more shells. The central core (5) possesses the highest dielectric constant. Moving outwards from core (5) to the outermost layer (15), the dielectric constant becomes progressively smaller. In terms of the magnitude of dielectric constant or permittivity, in FIG. 1*a*, then (5)>(10)>(11)>(12)>(13)>(14)>(15). Each shell may be made of two hemi-spherical parts which are set one against the other around the previous shell. The contact surfaces of the two parts constituting two adjacent shells may be at 90° or substantially 90° in order to reduce the lack of homogeneity which could occur. A contact surface is illustrated at (20). Shell (10) encases the central core (5). The outermost layer (15) possesses the lowest dielectric constant when compared with the other layers of the lens and may be present in the form of a foam. The other layers are filled polymer compositions in accordance with the invention comprising a polymer and a filler material, wherein the filler material comprises titanium dioxide ($TiO_2$) and the polymer is selected from any one or more of: high density polyethylene (HDPE), cyclic olefin copolymer (COC), polyphenylene ether (PPE), polypropylene (PP), and fluorinated ethylene propylene (FEP). Optionally, at least one of the layers may comprise a polymer and a filler material which is other than $TiO_2$. An external cover or radome (not shown) may completely cover the lens (1) in order to make it weatherproof. The precise nature of the weatherproof cover may depend on what use the lens structure is put. Typically, the dielectric constant may range from about 16 (in the centre) to about 1.5 (outer layer). The shells (10-15), or at least some thereof may be welded together using method(s) in accordance with the present invention, including the second aspect of the present invention.

Method for Combining the Various Layers of the Multi-Layered Product.

As described above, in forming the multi-layered product, the present inventors have invented a method for designing said product and a method for combining the various layers of the multi-layered product.

In the second aspect of the present invention, there is provided a method of forming a shaped multi-layered article wherein said article comprises at least two parts which are chemically bonded, the method comprising:

assembling at least two non chemically bonded parts in a cavity of a tool to form an assembly of the at least two parts, wherein said cavity is adapted to receive the assembly of at least two parts in the form of the shaped multi-layered article;

sealing the cavity of the tool;

melting the assembly of at least two parts to chemically bond the at least two parts together to form the shaped multi-layered article.

By chemically bonded is meant the at least two parts may be bonded by covalent or molecular bonds. Any reference to a chemical bond disclosed herein includes a chemical or molecular bond. The chemical bonding may comprise or consist of covalent or molecular bonds. Therefore, the present invention provides a method of forming a shaped multi-layered article wherein said article comprises at least two parts which are covalently or molecularly bonded, the method comprising:

assembling at least two parts, which are not covalently or molecularly bonded, in a cavity of a tool to form an assembly of the at least two parts, wherein said cavity is adapted to receive the assembly of at least two parts in the form of the shaped article;

sealing the cavity of the tool;

melting the assembly of at least two parts to covalently or molecularly bond the at least two parts together to form the shaped article.

The at least two parts may be the at least two layers referred to in accordance with the first aspect of the present invention.

By sealing the cavity of the tool any potential leakage from the tool is minimised or prevented.

In the various aspects of the invention, the shaped article comprises an assembly of the at least two parts which are chemically bonded.

The at least two parts may be melted by the application of heat. The at least two parts may be heated to what is referred to herein as the welding temperature. The shaped article is cooled following chemical bonding of the least two parts. This may be done by leaving the tool and/or shaped article at room temperature and allowing it to cool naturally or it may be exposed to a temperature at less than room temperature in order to speed up cooling.

Typically, the cavity is shaped to match the outer surface profile of the assembly of at least two parts or layers. The cavity may be scaled to be larger than the volume of the assembly of at least two parts at room temperature (for example at about 20° C.) in order to allow for some expansion of the assembly during its transformation into the final shaped article during heating. For example, the cavity may be scaled to be larger in volume than the assembly of the at least two parts at room temperature (e.g. about 20° C.) by about 0.5-6 vol % or about 0.5-3 vol % or about 1-2 vol %.

Advantageously, the at least two non chemically bonded parts are assembled to form an interface between the at least two parts and, following melting, a chemical bond is formed across the entire interface or substantially the entire interface. The percentage of the area of the interface which is bonded may be at least about 90% and up to about 100%. For example, the percentage of the area which is bonded may be at least 92% or at least 98%. The percentage of the area of the interface which is bonded may be up to about 98% or 99%. Pressure may be applied to the assembly of the at least two parts during formation of the chemically bonded shaped article.

Essentially, the tool is provided in more than one part to enable access to the cavity and for the at least two non chemically bonded parts to be assembled in the cavity and subsequently removed.

The tool for use in accordance with the present invention may be subjected to certain design parameters for controlling the balance of conditions within the tool cavity. The tool typically provides a sealed pressurised environment. Pressure serves to eliminate or reduce any gaps between parts in the assembly and hence the shaped article which is formed in accordance with the present invention, resulting from geometrical tolerances of the manufacturing process from which the parts were made, and to provide sufficient bond pressure to bring the parts into intimate contact and provide high strength chemical bonds. Preferably, material flow is reduced or even more preferably eliminated to preserve the geometry of the parts being welded and to control the geometry of the interfaces in the final shaped article which may be referred to herein as the welded assembly which is, after the welding process, one single object which can no longer be separated into its constituent parts. The assembly of non bonded parts before the welding process is performed is referred to herein as the assembly of parts.

The present inventors have found that optimum results may be achieved by using a welding temperature which is within ±5° C. of the melting temperature of the at least two parts. If parts are used of different materials (e.g. different polymers), then the melting point of the material possessing the highest melting point is used as the welding temperature (or a higher temperature). The temperature may be minimised to minimise expansion but should be high enough to adequately soften the parts to allow part interfaces to move together in an interference fit and, for the case when polymers are used, polymer chains to form the required chemical bond.

At the optimum weld temperature, the tool cavity may be scaled (typically uniformly in x, y and z directions) so as to be larger in volume than the room temperature volume of the assembly of parts. This is to prevent excessive pressure and leakage out of the cavity but also allows for the shaped article to be easily inserted into the tool cavity before welding and to shrink back from the cavity wall during cooling and re-solidification, releasing the shaped article cleanly from the walls of the cavity (eliminating flash contamination on the surface of the tool which would need to be cleaned before subsequent welding of another part) and allowing for easy removal of the welded assembly. Scaling ratios by a volume of about 0.5-6% are preferred, more preferably about 0.5-3%, even more preferably about 1-2%. These scaling ratios are suitable for use with parts made from Low Density Polyethylene (LDPE), Medium Density Polyethylene (MDPE), Linear Low Density Polyethylene (LLDPE), High Density Polyethylene (HDPE) and Polypropylene (PP). The optimum ratio may depend on the thermal expansion of the constituent parts (e.g. polymer), volume % loading of filler, thermal expansion of the filler material and the geometry of the part(s), the thermal expansion coefficient of the tool materials and the welding temperature (range).

The volume of the parts can be readily calculated from measurement of the part masses if the density of the materials used to make the parts (e.g. polymers) is known. The expansion rate of the materials may be measured using techniques such as thermal mechanical analysis.

When the welded assembly (i.e. the shaped article) is to be cooled, typically the outer surface temperature of the welded assembly will drop below the glass transition temperature, below the heat deflection temperature, or below the Vicat softening temperature before the welded assembly can be removed. To some extent this will be dependent on the nature of the (polymer) materials and the geometry of the welded assembly (or shaped article).

The heating time may be reduced by the use of any of inductive tool heating, contacting opposite surfaces (e.g. top and bottom) of the tool to heated elements, e.g. platens, heating the tool to a temperature higher than the weld temperature which will increase the rate of heat flow, or by using fluid channels within the tooling to allow for the use of Rapid Temperature Control (RTC) tooling (which typically uses circulating fluid, or pressurised steam to quickly heat and cool the tool), or by inserting pre-heated parts into pre-heated tools.

Welding time can be considered to be instantaneous once the heat has been conducted through the entire volume of the assembly of parts via the surface of the tool cavity through to the centre of the assembly of parts, such that the entire volume of the assembly of parts is at or above the required weld temperature. In reality, the welding process takes a finite time but this time is so much smaller than the required time for heat conduction so as to be considered instantaneous.

Reduced cooling time can be achieved by moving the tool to a refrigerated environment once the weld cycle is complete, immersing the tool in a cooling fluid, or via the use of RTC tooling. RTC tooling can significantly decrease cycle time at the expense of the energy required to provide the rapid changes in temperature.

Both the heating and cooling time can be reduced by designing the shaped article with a (central) cored hole through which a metal pin protruding from the tool cavity can be inserted during assembly of the tool and arranging the assembled parts. As the thermal conductivity of metals is significantly higher than that of polymers, this allows heat flow in from the centre of the assembly as well as the circumference and effectively reduces the distance over which the heat flows through a low thermal conductivity polymer.

To reduce manufacturing cost and facilitate the method being scalable to high volume manufacture (with, for example, many assemblies per minute being welded) then robotic assembly/disassembly of parts and tools may be used. Advantageously, the tool design concepts described herein are amenable to robotic manipulation. Conveyorised continuous ovens or paternoster ovens or RTC cooling may be used to allow high throughput. The method in accordance with the present invention is suitable for use in preparing shaped articles of any architecture and/or geometry.

A paternoster oven provides advantages in that each shelf can be designed with an integral clamping mechanism to provide tool closure forces for a stack of one or more tools. This oven may have a heating phase during raising of the stack of tools, followed by a cooling phase during the descent of the stack of tools.

The method in accordance with the present invention has a number of advantages in connection with the assembly of multi-layered or multi-part, complex shaped articles. All voids from mis-matched part tolerances are eliminated or reduced during the welding process, meaning part tolerances can be relaxed, thus further reducing manufacturing costs. The method is insensitive to the number of parts or layers and the architecture of the assembly or shaped article. This means equipment and factory lines do not need to specialise on one single product design (as is the case for example with multi-shot moulding and to a lesser extent other polymer welding techniques). This is helpful to reduce capital expenditure for multiple product lines or new product launches. Geometrical tolerances are also well controlled.

The method in accordance with the present invention is applicable to any assembly of thermoplastic parts in a range of industries where conventional polymer welding techniques, over-moulding, multi-shot moulding, or chemical adhesive bonding is found to have limitations. In particular, the method is well suited to thick assemblies, or assemblies of many parts which would otherwise require many assembly steps and multiple pieces of bespoke equipment and tooling. Another advantage of the present invention for thick assemblies is that the slow cooling rate, inherent in the process, leads to thorough annealing and growth of crystallites (in semi-crystalline polymers), giving rise to a reduction in residual stress and potential for changes in geometry and warpage in high service temperature environments.

The method in accordance with the present invention is well suited for use with functional polymer parts, which might be heavily loaded with any one or more of a range of filler materials including those which provide one or more functions.

The method in accordance with the present invention is also well suited for preparing complex, irregular and/or doubly curved shapes of varying section thickness which can be difficult to weld using conventional polymer welding techniques. The shaped articles formed in accordance with the method of the invention may be suitable for use in a broad range of applications.

The tool for use in connection with the method of the present invention is preferably constructed of two parts with a split line to allow for opening and insertion of constituent parts and removal from the cavity of the shaped article. The split line may be in a form so it does not act as a leak path for molten material from the assembly of parts out of the tool cavity. A parallel faced butt joint may be used to eliminate leakage. The tool for use in connection with the method of the present invention may be constructed of more than two parts.

The two tool parts or halves (which may be designated as core and cavity) may be inserted in a press (e.g. a platen press) to provide the clamping force to maintain closure of the tool during welding. The present inventors have found that clamping forces of about 20 tonnes are adequate for a shaped article with an assembly area parallel to the plane of the split line of approximately 30 cm$^2$. The platens of the press can furthermore be heated (by electric elements or oil for example) to provide the tool heating required to bring the parts of the weld assembly up to the required temperature. Threaded bolts or bayonet fittings (which may be alternated) can be incorporated into the tool design to maintain the required closure force during the weld cycle. This has the advantage that the tools may be mobile and can be moved through a heat source such as a conveyorised oven. By way of example, M8 bolts (e.g. 8 in total) provide sufficient closure force for tool sizes up to about 150 mm diameter.

Another and preferred approach to seal the tool split line is to extend the bore of the cavity part of the tool. The core part of the tool may then form a piston which fits into the extended bore (for example an overlap of about 25 mm has been found to be adequate.) The material of the core/piston part of the tool is preferably chosen to have a higher thermal expansion than the material of the cavity/bore part of the tool.

Preferably, aluminium is used for the piston/core and steel for the cavity/bore. At the weld temperature, the piston thus expands to close the gap between the two tool parts (or halves) and provides an interference seal which has been found to resist leakage from exceptionally high internal cavity pressures. The softer material of the core and cavity parts may be surface treated to ensure its surface hardness is similar to the harder material to prevent wear and damage to the piston/bore and extend the life of the tool. For example, aluminium pistons may be hard anodized. By using different materials, increased cavity pressures are obtainable resulting in improved bond strengths. Thermal expansion forces from the assembly of parts (which can act to open the tool) are easier to resist with this tool design. A simpler bayonet design or fewer bolts may be required as the cavity pressure does not apply directly against the tool closure forces.

Figure 7A:
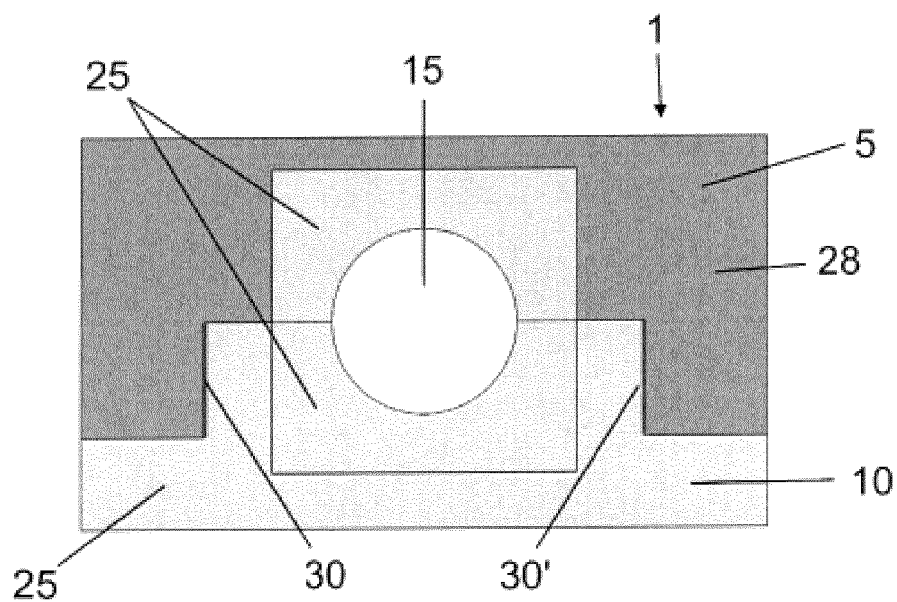
FIGS. 7a and 7b show the centre cross section of a tool for use in accordance with the present invention suitable for carrying out a method of forming a shaped article.
Figure 7B:
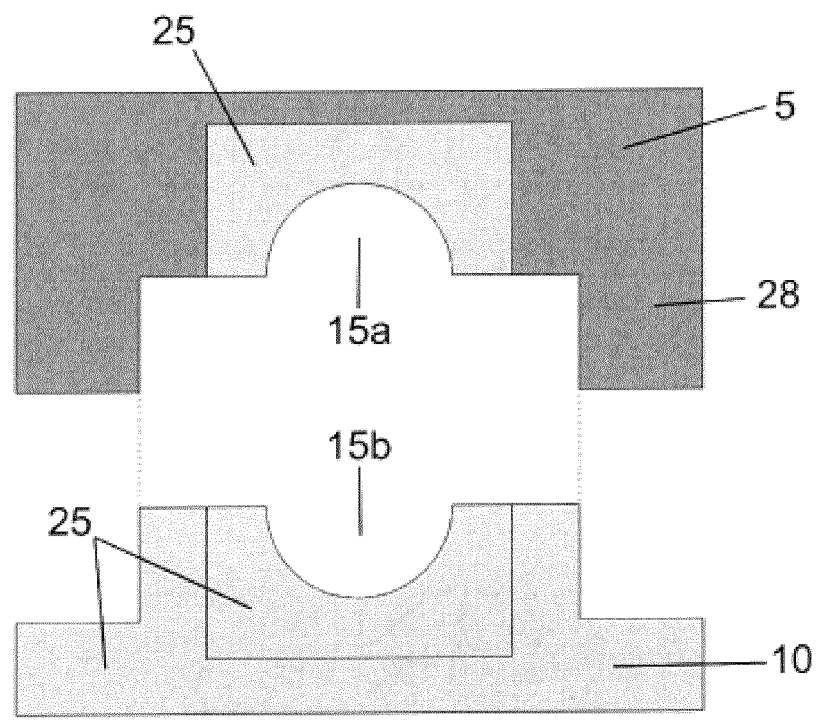

FIGS. 7*a* and 7*b* are schematic (cross-sectional) representations of a tool suitable for use in carrying out the method of forming a shaped article in accordance with the present invention. The tool represented generally in FIG. 7*a* at (1), comprises a first part indicated generally at (5) and a second part indicated generally at (10). The tool is shown in an open position in FIG. 1(*b*) and is essentially made from the two main parts (5, 10). In FIG. 7(*a*) a cavity is depicted at (15) formed by the two parts (5), (10) being brought together. In order to form the shaped article, at least two parts, e.g. filled thermoplastic polymer (not shown) are arranged in the cavity (15). The two parts of the cavity when the tool is an open position are indicated at (15*a*) and (15*b*). The at least two parts of the shaped article may be assembled in (15*a*) and/or (15*b*). In the embodiments depicted in FIGS. 7*a* and 7*b*, the tool is split to essentially form a core part and a piston part. The areas (25) may be made from material possessing a higher thermal expansion such as aluminium and the areas (28) may be made from a material possessing a lower thermal expansion such as steel. When the two main parts (5,10) are brought together in a heated environment a sealing face is formed between them indicated at (30, 30'), facilitated by the expansion of the material possessing a higher thermal expansion (25).

Figure 8:
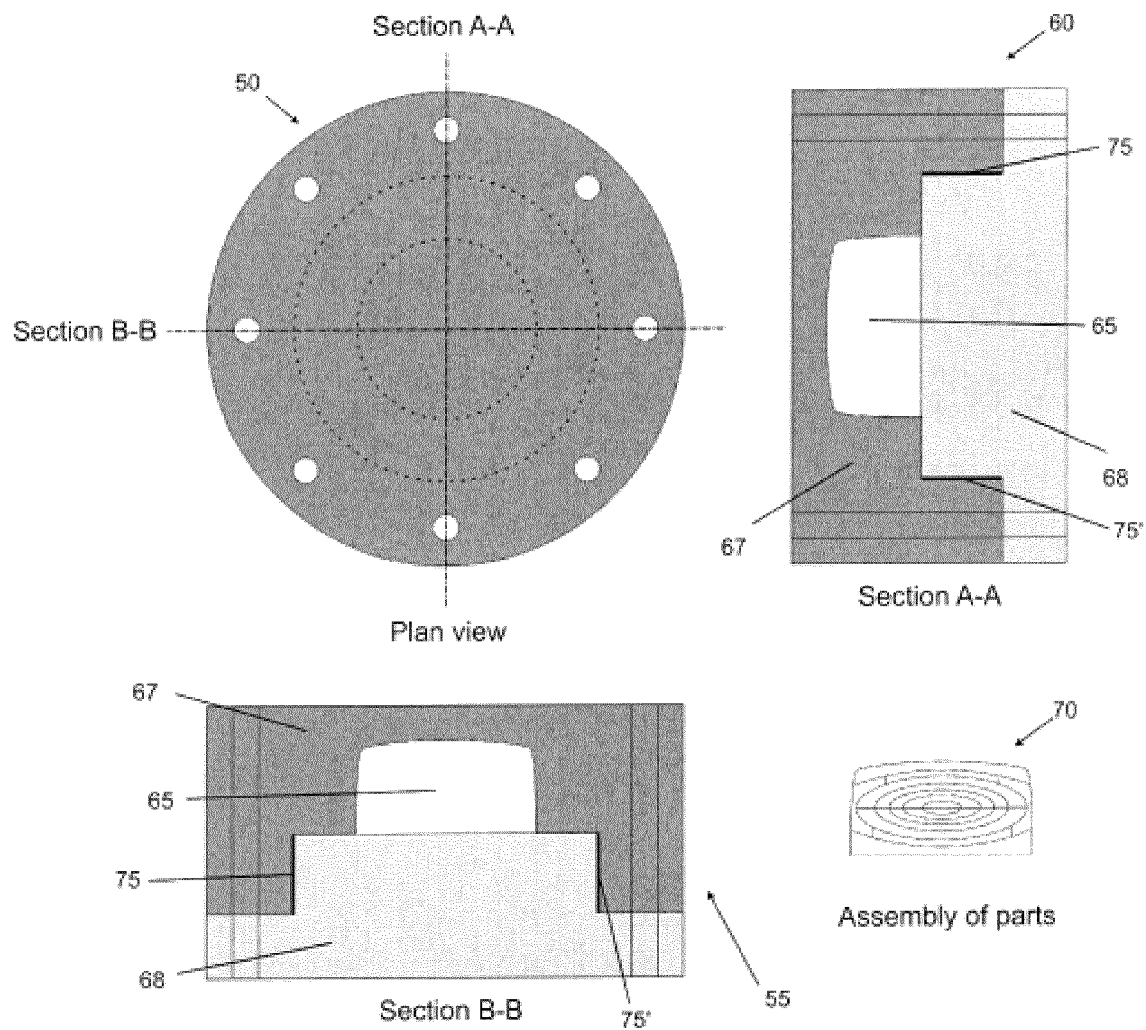
FIG. 8 shows an example of an assembly of parts in cross-section and an orthographic projection of the corresponding tool design in accordance with the present invention.

FIG. 8 shows an example of an assembly of parts in cross-section and an orthographic projection corresponding tool design in accordance with the present invention. In FIG. 8, a plan view of a tool design is shown generally at (50) and indicating the Section cuts at A-A and B-B. In Sections A-A and B-B indicated generally at (60) and (55) respectively, a cavity is depicted at (65). An assembly of parts is indicated generally at (70) which comprises a number of parts or layers. The assembly of parts indicated at (70) does not possess an undercut. The tool is essentially made from two parts (67, 68). The tool part (68) is preferably made from aluminium and the tool part, i.e. the bore (67) from steel. The tool part (68) forms a piston which slides inside the bore (67) and, owing to the higher thermal expansion of aluminium, forms an interference fit at faces (75) and (75') which provides a seal to contain the assembly of parts (70) inside the resulting cavity (65).

Figure 9:
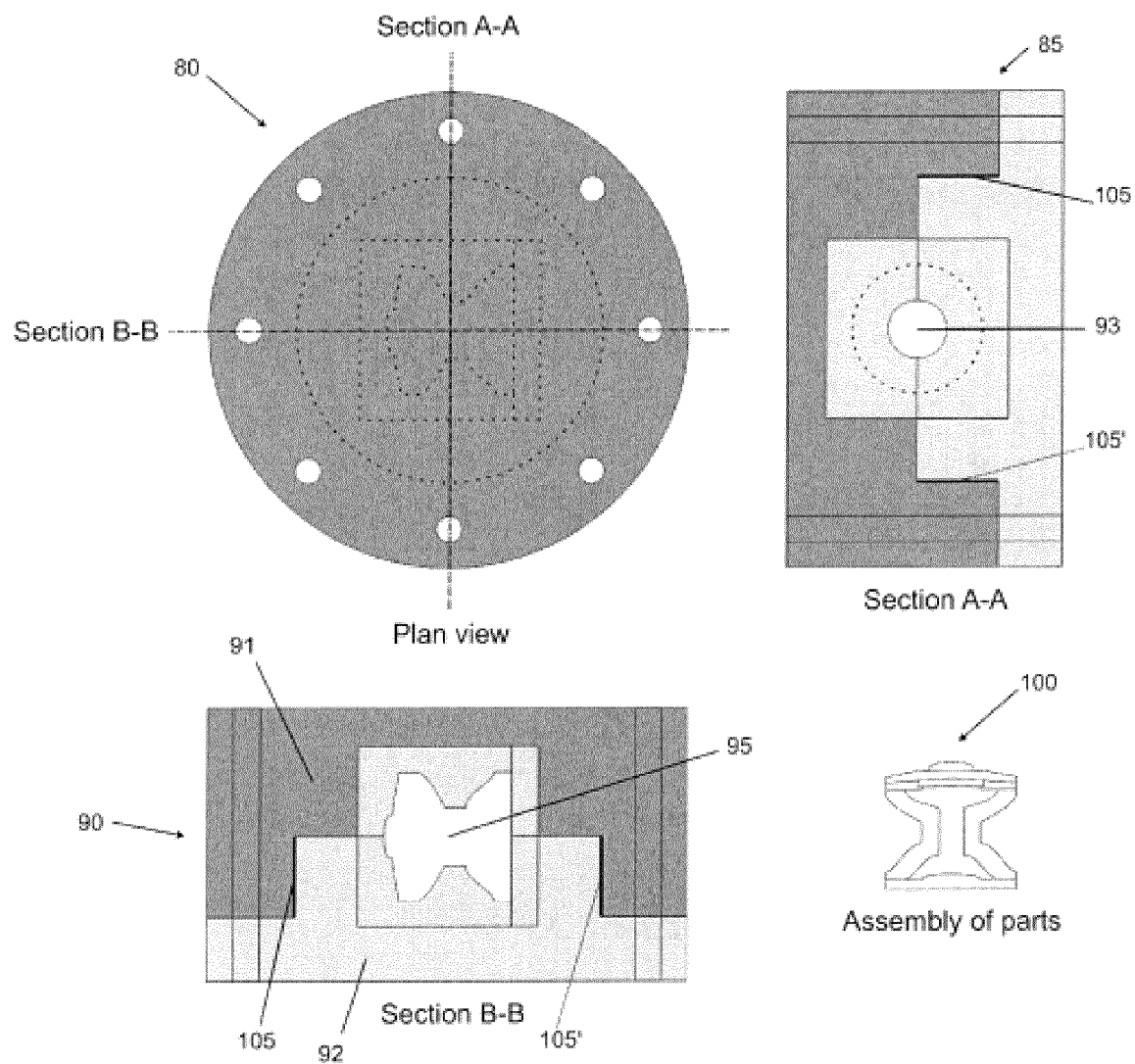
FIG. 9 shows an example of an assembly of parts in cross-section and an orthographic projection of the corresponding tool design in accordance with the present invention. The assembly of parts comprises an undercut and the corresponding modifications to the tool design are highlighted.

FIG. 9 shows an example of an assembly of parts in cross-section and an orthographic projection corresponding tool design in accordance with the present invention. In FIG. 9, a plan view of a tool design is shown generally at (80) and indicating the Section cuts at A-A and B-B. In Sections A-A and B-B indicated generally at (85) and (90) respectively, a cavity is depicted at (93) and (95) respectively. An assembly of parts is indicated generally at (100) which comprises a number of parts or layers. The assembly of parts indicated at (100) possesses an undercut. The tool is essentially made from two parts (91, 92). The tool part (92) is preferably made from aluminium and the tool part (91) from steel. Feature (92) forms a piston which slides inside the feature (91) which forms a bore and, owing to the higher thermal expansion of aluminium, forms an interference fit at faces (105) and (105') which provides a seal to contain the assembly of parts (100) inside the resulting cavity (93) and (95). The part is oriented such that the undercut in shape is aligned to the axis in which the piston (92) is moved in to the bore (91). Thus the tool can be disassembled with one axial motion and is amendable to automation by robot for example for an undercut geometry.

Method of (Designing and) Making the Multi-Layered Article or Product

As described above, in forming the multi-layered product, the present inventors have invented a method for designing and making said product.

In the third aspect, the present invention provides a method of making a shaped article comprising at least two parts which are joined, the method comprising:
creating a design of said shaped article and defining a split line on said design (or comprises defining a split line on a design of a shaped article), wherein said split line divides the shaped article to provide at least a first part and a second part;
wherein said first part comprises at least one projection;
wherein said second part comprises at least one recess;
preparing said first part and said second part in a moulding process;
joining the prepared first part and the prepared second part together by engaging the at least one projection with the at least one recess.

The moulding process is preferably an injection moulding process.

In the fourth aspect there is provided a method of making a shaped article comprising at least two parts which are joined, the method comprising:
creating a design of said shaped article and defining a split line on said design (or comprises defining a split line on a design of a shaped article), wherein said split line divides the shaped article to provide at least a first part and a second part;
wherein said first part comprises at least one projection;
wherein said second part comprises at least one recess;
preparing said first part and said second part in an injection moulding process; joining the prepared first part and the prepared second part by engaging the at least one projection with the at least one recess.

In the method of the invention, the design of the shaped article may be split into any number of parts. For example, there may be up to ten parts formed. There may be up to 100 parts or more. In the method in accordance with the invention there may be less than six parts, for example less than five parts, for example less than four parts, for example less than three parts. The at least two parts may be the only parts which constitute the shaped article.

The at least two parts are typically thermoplastic or at least one of the parts is thermoplastic. The at least two parts may be (thermoplastic) polymer comprising a filler material. Reference may be made herein to a polymer composition, i.e. the at least two parts (or layers) may be at least two polymer compositions. The shaped article may be a multi-layered article or product in accordance with the first aspect of the invention. The parts may be polymer compositions as referred to in accordance with the present invention.

The at least two parts, i.e. the prepared first part and prepared second part may be joined by welding. Alternatively, the at least one projection and at least one recess may engage such that no further step is required to complete joining of the parts. The at least two parts may be joined in a snap fit arrangement.

There may be present greater than one projection on at least one of the parts. The number of projections present is not necessarily limited and an appropriate number of projections are present in order to effectively form a continuous split line between the two parts so neither part has a section thickness greater than the maximum section thickness required of the moulding process, for example 4 mm. Any of the parts present may possess a combination of projections and recesses. Therefore, the first part may comprise at least one projection and at least one recess, and/or the second part may comprise at least one projection and at least one recess. The projection(s) referred to herein may be in the form of castellation(s).

Advantageously, the method in accordance with the present invention provides one or more of the following advantages: the provision of complex shaped articles possessing thick cross-sections, minimal or no deformities such as sink defects, high geometrical tolerance, lower cycle time and part manufacturing cost while maintaining the design footprint of the original part design once the at least two parts are assembled and joined. In addition, the method in accordance with the present invention is scalable to relatively large section parts without the need to increase the maximum section thickness of a given part or requiring the part to be split into more than two parts if so desired.

The incorporation of the projections (or castellations) and associated geometries described herein seeks to provide a method for making shaped articles with desired geometries by designing constituent parts which, when assembled, provide said shaped article. This is achieved in accordance with the present invention by designing the article and introducing a split line in order to split the article into a number of parts. Preferably the shaped article is split into two parts.

The projection or castellation geometry described herein allows the same thick section footprint to be realised in the finished article whilst not having to mould any section which is thicker than that easily attained by (injection) moulding. Advantageously, a broad range of section thickness can be broken up or divided in this way.

Figure 12:
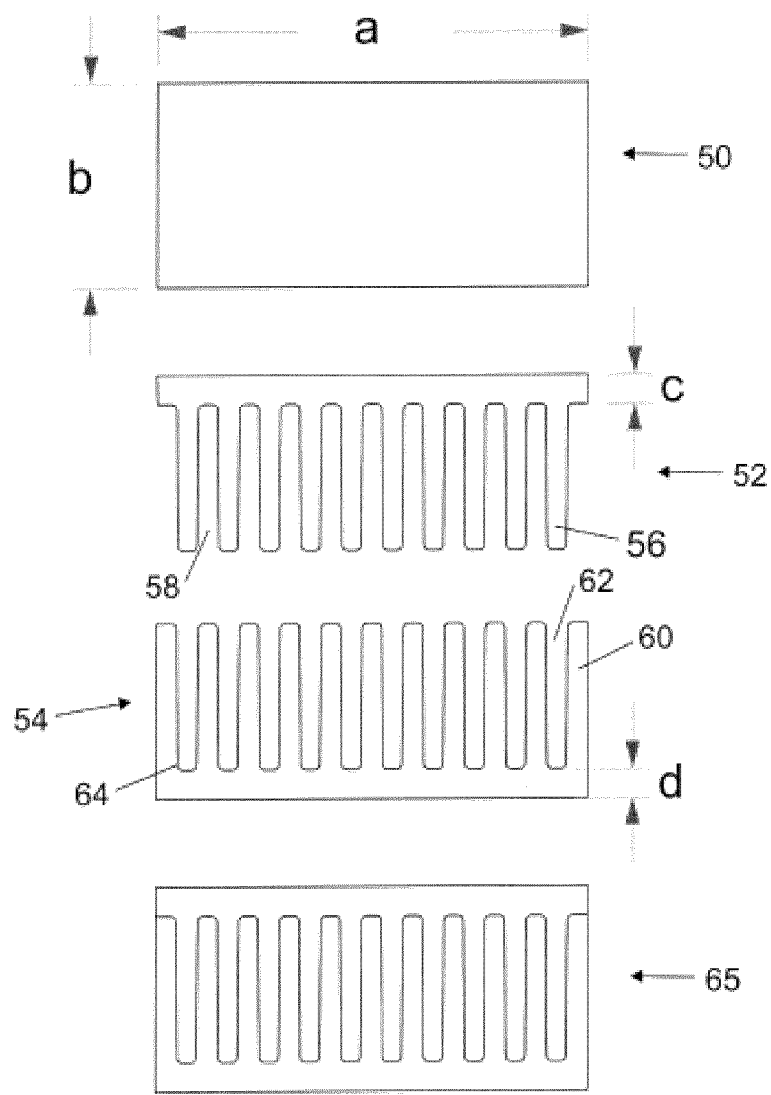
FIG. 12 illustrates the cross section of a shaped article and its constituent parts in accordance with the present invention and associated typical dimensions.

For example, the simple rectangular plate cross section in FIG. 12 may be 28 mm thick. This could not be injection moulded (or at least not to any economical or acceptable standard) and typically may need to be split into six or more parts if it is to be injection moulded. Advantageously, and in accordance with the present invention, the projections (e.g. castellations) allow this part to be moulded in only two parts whilst maintaining the maximum section thickness in the moulded geometry of the at least two parts below 4 mm, thus providing a simplified method for moulding thicker shaped articles in more economically acceptable cycle times and without losing control over geometry due to sink and void formation.

The at least two parts may be joined together by polymer welding techniques such as ultrasonic welding or vibrational welding. In these techniques, energy is directed to the bondline by frictional heating under a clamping force which melts a thin interfacial layer of the part or parts which are typically made from thermoplastic polymers. The parts may be polymer compositions as referred to in accordance with the present invention.

Parts may also be designed with snap fitting projections or snap fitting joints where the geometry of one part is designed with a locking feature on the end of a projection (e.g. lever) which flexes to one side during part assembly and allows the parts to be pushed together until the locking feature fits into a matching recess (or depression) on the second part (which may also be referred to as a locking feature, or complimentary locking feature). The stored energy due to deformation of the projection or lever allows the projection or lever on the first part to move back to its original position once the locking feature is accepted in the depression or complimentary locking feature, leading to an interference fit due to the geometry (e.g. one or more undercuts) that allows for the parts to be temporarily or permanently held together. The degree to which the joint is permanent or temporary is typically dependent on the design of the projections or locking features.

A further technique developed by the present inventors and as referred to above comprises the assembly of parts in a single processing step by re-melting the assembly of parts within a tool designed to match the outer circumference shape of the assembly. This method is well suited to assembling many thermoplastic parts and is well suited to the assembly of the at least two (complex) parts which may be shaped resulting from this invention. As such, the at least two prepared parts may be joined in a method which comprises:
  assembling the at least two prepared parts in a cavity of a tool to form an assembly of the at least two parts, wherein said cavity is adapted to receive the assembly of at least two parts in the form of the shaped article;
  sealing the cavity of the tool;
  melting the assembly of at least two parts to chemically bond the at least two parts together to form the shaped article.

The method in accordance with the present invention comprises creating or taking a design of a shaped article and defining a split line on said design, wherein said split line divides the shaped article to provide at least a first part and a second part. The split line is preferably a single and continuous line. The design may be created using computer aided design (CAD) software, a drawing or a geometrical model. Examples of suitable 3D drawing software are Solid Edge™ or Solid Works™.

Following their formation, the at least two parts are joined together to form the shaped article (i.e. multi-layered article or product). The at least two parts may be aligned and joined by the engagement of the projection(s) and recess(es) or by the engagement of castellations, present on each of the first and second parts. The at least two parts may be welded together using polymer welding techniques as described herein. The at least two parts may be bonded using chemical adhesives. Optionally, if an additional locking feature(s) is incorporated in one or more of the projections which are designed to mate to a corresponding feature in the mating part (e.g. depression) leading to an interference fit (known as a snap fit), further treatment to join the at least two parts together may not be required.

The method in accordance with the present invention comprises the following steps: providing a first part wherein said first part comprises at least one projection; providing a second part wherein said second part comprises at least one recess; joining the first part and the second part together by engaging the at least one projection with the at least one recess.

The at least one projection may be any shape and/or size. For example, the projection may be essentially, square, rectangular or curved in cross section or may comprise a combination of curved edges and straight edges. Though the method of the present invention is directed to at least one of the parts comprising a projection and the other part comprising a recess, it will be appreciated that the presence of projections on a part may inherently result in the presence of a recess or gap on said part.

The at least one projection may be one or more castellations. The one or more castellations may be an annular ring or rings, a linear rib or linear curved ribs, a curved rib or curved ribs.

The castellation (parent castellation) may itself comprise one or more castellations situated thereon or extending therefrom which may be referred to herein as child castellations. Said child castellation or castellations may comprise one or more castellations situated thereon or extending therefrom which may be referred to herein as grandchild castellations. The same terminology may be more generally applied to the term projection(s), i.e. child projections and grandchild projections.

Advantageously, the projections, e.g. in the form of castellations form an alignment feature to aid in the alignment of parts during assembly of parts following moulding. This is particularly beneficial if robotic or automated equipment is used to handle or assemble the parts.

Figure 13:
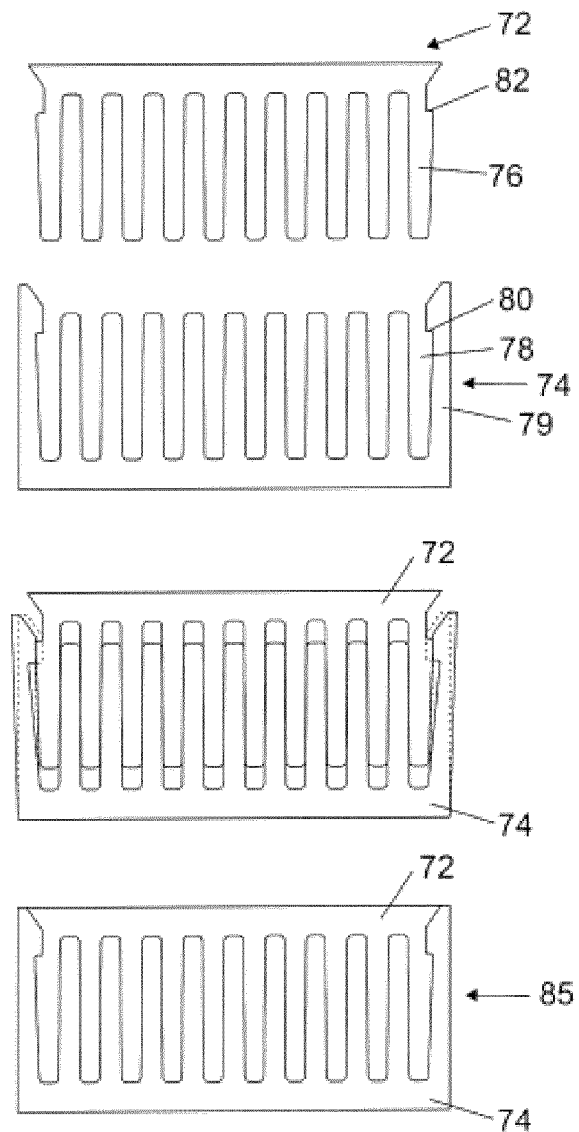
FIG. 13 shows a modification to the parts shown in FIG. 12 to facilitate a snap-fit arrangement.

One or more of the projections or castellations may comprise a locking feature projection which is designed to fit within a matching recess or depression on the second part. The presence of a locking feature or features allows for the at least two parts to be held together in intimate contact. A locking feature geometry, suitable for use in a snap-fit connection, is illustrated in FIG. 13.

By introducing locking feature(s) into the projection (castellation) cross-section, the at least two parts can be designed to be temporarily or permanently joined to one another in intimate contact and provide the option of no chemical welding of the parts being necessary, thereby reducing further cost from the manufacture and assembly of the shaped article.

The present inventors have found that preferably the thickness of the child projections (castellations) is no more than 0.75 times the section thickness of the parent section or parent projection (castellation). The present inventors have found that this ensures the prevention of areas of sink in the parent section opposite where projections (castellations) join the parent section.

Grandchild projections (castellations) are preferably no more than 0.75 times the section thickness of the child projection (castellation) or section they extend from.

At the junction where the base or root of the child projection (castellation) meets the parent projection (castellation) a curve may be present in order to reduce stress concentration. Preferably the minimum radius is at least 0.25 times the parent section thickness.

The projection (castellation) cross section may at its tip possess a matching radius with that of the recess to which it is to be joined. The surface geometry of the at least two parts to be joined may mirror one another and a tessellated fit is possible when the at least two parts are assembled. If projections on one part are designed to be slightly wider than required for a tessellated fit, the resulting interference fit may prevent the parts from coming fully together. However, ultrasonic welding techniques can be used to melt the parts along the faces of this interference and thus provide the final relief necessary to move the parts together and form the final geometry of the shaped article whilst at the same time providing a permanent chemical bond once the polymer has re-solidified.

One or more of the projections or castellations may possess a draft angle of about 0.5° to about 5°, e.g. about 2° to about 5°, relative to the axis of the mould opening in order to aid removal from the cavity of the (injection) moulding tool and for easier alignment and assembly of the parts after moulding is complete.

The parts may be assembled to form a shaped article or product by polymer welding techniques such as ultrasonic welding or vibrational welding. In these techniques, energy is directed to the bondline by frictional heating under a clamping force which melts a thin interfacial layer of the part or parts which are typically made from thermoplastic polymers.

Figure 10:
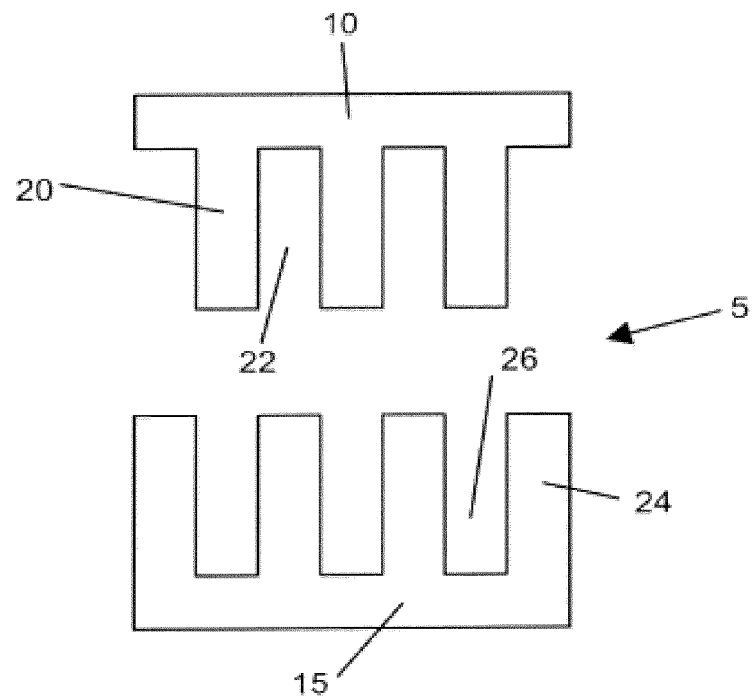
FIG. 10 shows a cross section of at least two parts in accordance with the present invention which may be engaged or joined in order to form a shaped article.

FIG. 10 shows at least two parts in accordance with the present invention indicated generally at (5) which may be engaged or joined in order to form a shaped article or part thereof. In FIG. 10, a first part (10) is shown possessing a number of projections in the form of castellations, one of which is indicated at (20), plus a number of recesses in between the castellations, one of which is indicated at (22). A second part (15) in effect reciprocates the first part (10) and a castellation and recess are indicated at (24) and (26) respectively. A joined structure comprising a greater number of castellations is shown in FIG. 12.

Figure 11:
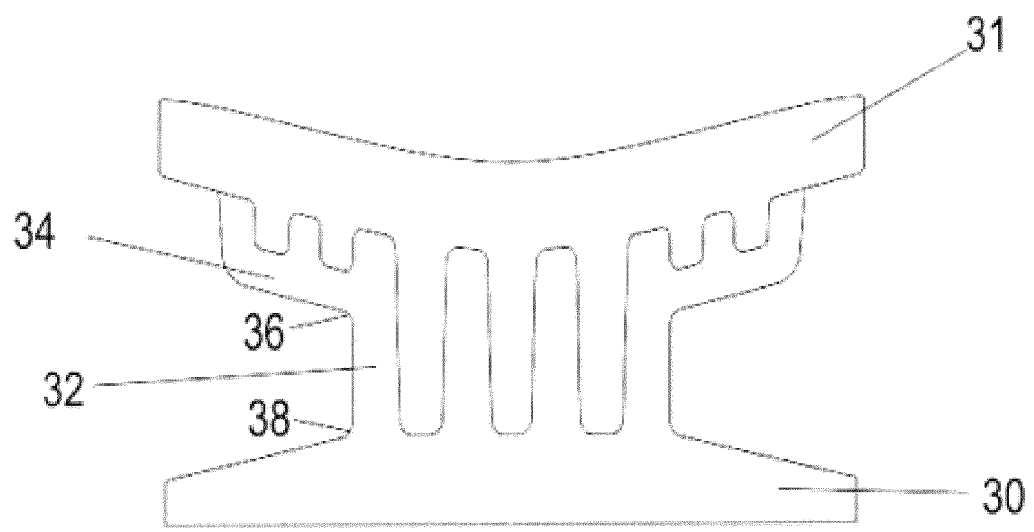
FIG. 11 illustrates a cross section of at least two parts which are joined to form a shaped article and further illustrates the presence of projections (e.g. castellations) and child projections (e.g. child castellations).

FIG. 11 illustrates a more complex shaped article which may be formed in accordance with the present invention. The main body of the parts is indicated at (30) and (31). A parent projection (in the form of a castellation) extending from the main body of the part (30) is indicated at (32), extending therefrom is a child castellation (34). Grandchild castellation(s) (not shown) may extend from the child castellation(s). The junction of the child castellation with the parent castellation is shown at (36) and the junction of the parent castellation with the main body is indicated at (38).

FIG. 12 illustrates a shaped thick article in the form of a rectangular cross section design indicated at (50). This may be described as a nominal shaped article cross section. The shaped article is shown with dimensions indicted at (a) and (b). By way of example, "a" may be about 60 mm and "b" about 28 mm. Conventionally, such a shaped article would need to be (injection) moulded in a large number of parts in order to achieve a good quality product. In accordance with the method of the present invention, by designing and introducing a single continuous split line to divide the article to form two parts via a number of projections or castellations, it is possible to reduce the number of parts required to just two. The two parts are indicated at (52) and (54). Projections or castellations are indicated on the first part and second part at (56) and (60) respectively and recesses at (58) and (62) respectively. By introducing a number of projections or castellations, shaped articles may be sub-divided into parts with reduced section thickness in their cross section which may be moulded separately thus addressing some of the problems associated with injection moulding thicker parts. For example, the dimension at "c" may be 4 mm. The castellations (56) and (60) and recesses (58) and (62) are illustrated in FIG. 12 as possessing rounded or curved ends. In effect, the surface geometry of the at least two parts to be joined mirror one another and a tessellated fit is provided when the at least two parts are assembled. The final shaped article is indicated generally at (65). The two parts (52) and (54) may, for example, be joined by welding to form the final shaped article or part thereof. If projection cross section on one part are designed to be slightly wider than required for a tessellated fit, the resulting interference fit may prevent the parts from coming fully together. However, ultrasonic welding techniques can be used to melt the parts along the faces of this interference and thus provide the final movement necessary to form the final geometry of the shaped article whilst at the same time providing a permeant chemical bond once the polymer has re-solidified. The final shaped article (65) when compared with the nominal shaped article (50) retains or possesses the same or substantially the same geometry footprint.

FIG. 13 shows at least two parts in accordance with the present invention indicated generally at (72) and (74) respectively which may be engaged or joined in order to form a shaped article (indicated generally at (85). In part (72) the part is shown possessing a number of projections one of which is indicated at (76). A corresponding recess in part (74) is shown at (78). In a projection (79) present on part (74) a notch or locking feature (80) is present. The notch is designed to engage with a notch or locking feature (82) present on the projection (76) in a type of snap fit arrangement. The projections (76) and (79) possess sufficient flexibility so that when the parts (72) and (74) are pushed together, one or both of the projections (76) and (79) flex to one side, thus allowing the parts to be pushed together and engaged in a type of "snap-fit" arrangement. The stored energy in the flexed projections (76) and (79) allows the locking feature (80) to move back to its original position once the locking feature (80) is accepted in the locking feature (or depression) (82).

Polymer Foam

One or more than one of the layers in the multi-layered article or product may be a polymer foam. The present inventors have found that the use of a polymer foam layer is useful in tailoring the material properties of a given layer, particularly where a lower value for dielectric constant or permittivity may be required. This polymer foam layer may be located on the outer surface of an RF structure. Such a layer may act as a matching layer to reduce impedance mis-match and reflection attenuation of an incident signal travelling through the structure.

The polymer (or host polymer) for use in the polymer foam is a thermoplastic polymer. The thermoplastic polymer may be selected from one or more of a number of polymers. Any of the polymers mentioned herein for use in the present invention are suitable for use in the polymer foam. Any of said polymers may be in the form of a homopolymer or a copolymer.

A blowing agent is a type of foaming agent. The blowing agent is capable of producing a cellular structure via a foaming process. The blowing agent may be selected from one or more of a number of known blowing agents, including hydrocarbons, (liquid) $CO_2$, nitrogen, isocyanate, azodicarbonamide, sodium bicarbonate.

Another example of a type of foaming or blowing agent which is preferred for use in the method of the present invention is polymers (e.g. polymer spheres or polymer shells), which encapsulate a gas or more than one gas or a liquid or more than one liquid or a mixture of gas(es) and liquid(s). Essentially, the material contained within the polymer shell may be capable of forming a gas when used as a foaming or blowing agent, e.g. when activated. These polymer spheres may be referred to herein in as polymer bubbles or polymer microspheres. Polymer microspheres are commercially available and sometimes marketed as a (light weight) filler and a blowing agent in one and may also be referred to as thermoplastic microspheres. The encapsulated liquid or gas is the blowing agent and the polymer sphere (or shell) may act as a filler. The combination of the polymer sphere and encapsulated liquid or gas may also more generally be referred to herein as a blowing or foaming agent. In the method in accordance with the invention, and prior to heating the composition in (a), polymer microspheres may be incorporated (e.g. compounded) into the host polymer. Therefore, the polymer microspheres may be compounded into the host polymer prior to the formation of the shaped article in an injection moulding technique. The polymer microspheres may be activated (i.e. expanded) at the host polymer's optimum melt processing temperature thereby increasing in size and cast into the polymer as small bubbles or voids.

The polymer composition is heated to a temperature so that the polymer composition melts. The precise temperature or temperature range will be dependent largely on the particular polymer which is used. It will also be affected by the presence of the other constituents present in the polymer composition and the relative amounts thereof.

Advantageously, the method in accordance with the present invention provides one or more of the following: density reduction of a shaped foamed polymer article up to about 80% when compared with foamed polymers prepared in accordance with traditional techniques; a homogeneity throughout the shaped foamed article (or part thereof); elimination or reduction of the presence of a polymer skin; or the retention of a very thin layer of skin. A very thin layer of solid polymer skin is typically less than 100 μm thickness, or of the order of 1 polymer microsphere diameter in thickness. Retaining such a very thin layer of skin may be advantageous for surface friability and for protecting against contamination while at the same time possessing a minimal effect on RF frequencies.

The present inventors have found that shaped foamed polymer articles may be made using economical, high throughput techniques such as injection moulding where the foamed polymer possesses voids across its entirety. Optionally, there may be present a polymer skin which is less than 100 μm in thickness. The polymer skin is located at least on one outer surface of the foamed polymer.

The blowing agent is capable of producing a cellular structure via a foaming process. The blowing agent may be selected from one or more of a number of known blowing agents, including hydrocarbons, (liquid) $CO_2$, nitrogen, isocyanate, azodicarbonamide, sodium bicarbonate.

The present inventors have found that polymer bubbles or (thermoplastic) polymer microspheres are of particular use. A thermoplastic polymer which is essentially spherical, may form a container or shell for a gas or gases or liquid(s). Above a critical onset temperature, the polymer shell softens, or more specifically its modulus reduces below a certain critical value at which the pressure of the gas or liquid within the shell causes the shell to expand to many times its original size. The polymer microsphere possesses an expansion temperature range. The polymer forming the shell may be the same type of polymer as the host polymer or it may be a different polymer. The gas contained in the polymer shell may be selected from one or more of oxygen, carbon dioxide, nitrogen, or an alkane. Examples of suitable alkanes are butane and pentane. In the present invention, pentane is preferred. Materials which are liquid at room temperature may also or alternatively be contained within the shell such as water, organic solvents and higher fraction alkanes.

The polymer microsphere may act both as a filler and a blowing agent. The polymer microsphere may be combined with other blowing or foaming agents, for example any one or combination of the blowing or foaming agents listed herein. The polymer microsphere may be combined with the host polymer, for example the polymer microsphere may be compounded in the polymer host.

The polymer shell or thermoplastic material may have a diameter of about 1 μm to about 50 μm prior to expansion, for example about 5 μm to about 20 μm, for example about 5 μm to about 10 μm. On heating, the diameter may increase by a factor of about two to forty times. The polymer shell or thermoplastic material may have a wall thickness of about 0.1 μm to about 5 μm. On heating, this may decrease by a factor ranging from about five to about twenty times. Pre-expansion, the density of the polymer microspheres may be about 1000 $kg/m^3$. Post-expansion the density of the polymer microspheres may be around 5-40 $kg/m^3$. Typically, the polymer microspheres are expandable between temperatures of about 70° C. to about 250° C., for example about 80° C. to about 235° C.

The shell of the polymer microsphere may consist of or comprise one or more polymers which may be homopolymer(s) or copolymer(s). For example, the polymer shell may consist of or comprise of: an acrylonitrile, (ACN), ethylene vinylacetate (EVA), Poly(methyl methacrylate) (PMMA), Polyvinylidene chloride (PVDC), including a homopolymer thereof or a copolymer thereof. A polymer whose monomer is suitable for suspension polymerisation which has suitable melt strength and melting temperature range compatible with the processing temperature of the host polymer may be used. A thermoplastic polymer may be used which possesses a suitable melting range to match that or substantially match that of the host polymer, plus suitable melt strength and elasticity to allow the polymer shell to expand and suitable chemistry to facilitate suspension polymerisation. The polymer microsphere may be in dry or wet form. The polymer microspheres may be compounded to form a masterbatch thereof, for example in the form of pellets. The polymer into which the polymer microspheres are masterbatched may be any of the polymers referred to herein. The polymer constituting the shell of the polymer microsphere and the polymer of the masterbatch may be the same or different.

Examples of suitable commercially available filled polymer microspheres are the Expancel™ microspheres which are commercially available from Nouryon™. These thermoplastic microspheres encapsulate a gas. On heating, the gas expands and the shell softens resulting in a significant increase in volume of the microsphere. The microspheres are typically of the order of about 8-12 μm in diameter and on heating can expand up to about 40 μm in diameter. Prior to heating, the thickness of the shell may be about 2 µm and on heating this thickness may decrease to about 0.1 µm.

When polymer microspheres are used as the blowing or foaming agent, the host polymer should preferably possess a sufficiently low melt processing temperature which is below that of the maximum expansion temperature of the polymer microspheres. Above this temperature, the polymer shell melts and the bubble or microsphere may burst leading to a reduction in foam formation (i.e. the number of voids in the polymer) and contamination of the foamed polymer or shaped article with thermally degraded polymer from the polymer shell and gas or liquid contained therein.

When polymer microspheres are used, the host polymer should preferably possess a suitably low melt viscosity in order that the resistance to the expansion of the microspheres is minimised. A low melt viscosity may be characterised by a high melt flow rate which is typically the measure of a known mass of polymer passing through an aperture of known dimensions in a given time under a constant force.

A melt flow rate for use in accordance with the present invention may be ≥20 g/10 min. In particular, such a melt flow rate when used with HDPE is preferred. Polypropylene possessing a melt flow rate of >20 g/10 min is also preferred, however higher melt flow rates are also suitable, e.g. up to about 100 g/10 min. The melt flow rate or melt flow index is measured in accordance with ISO 1133. A suitable example of a commercially available polymer is Dow 25055E HDPE or Sabic FPC100 PP.

The polymer microsphere may be selected so as to provide optimum expansion at the processing temperature of the host polymer. For example, for host polymers HDPE and PP this is typically in the range of about 200 to about 260° C. A suitable commercially available polymer microsphere is 980DU120 from Nouryon. This material possesses a particle size of 25-40 µm, a starting expansion onset temperature of 158-178° C., a maximum expansion temperature of 215-235° C., and a theoretical minimum expanded density of s 14 kg/m³. Another example of a suitable commercially available sample is Nouryon 980MB120 which is 980DU120 compounded into EVA (host) polymer, e.g. in the form of pellets.

The expansion onset temperature, or expansion onset temperature range, is when the polymer microsphere shell starts to soften so it becomes pliable enough to begin stretching. The maximum (expansion) temperature, or maximum (expansion) temperature range is the temperature at which the polymer microsphere shell begins to melt, and the melt strength decreases and the shell may burst.

The amount of foaming agent (e.g. polymer microspheres) present in the polymer composition may be about 0.5 wt % to about 10 wt % or about 3 wt % to about 7 wt % based on the total weight of the polymer composition plus any other materials present (including the foaming agent) in said polymer composition. These ranges are based on the polymer microspheres in dry powder form and not when masterbatched or compounded.

The gas encapsulated by the thermoplastic polymer shell may provide an increase in volume which is up to forty times that of the unexpanded shell when heated to the processing temperature. Organic gases may be used, including pentane. Liquids may also be used.

The polymer microspheres may be manufactured using the suspension polymerisation processing technique. In this technique, an organic phase, consisting of monomers, blowing agent, initiator and a cross-linker, is mixed with a water phase consisting of water, colloid and surfactant. Through vigorous agitation, small monomer droplets form in the water phase forming an emulsion. The polymerization reaction is then initiated by heating, transforming the monomer droplets into thermally expandable microspheres. The droplets are stabilized by the colloid, for example either flocculated silica or $Mg(OH)_2$, and a surfactant.

In accordance with the present invention, the polymer microspheres in the form of pellets (e.g. 980MB120) may be mixed with the host polymer in the form of pellets (e.g. HDPE pellets) e.g. by simple tumble methods at a ratio of about 0.7-16% or 4-10% by weight before being added to the feedstock hopper of an injection moulding machine. By way of example, commercially available 980DU120 from Nouryon would typically need to be pre-compounded into HDPE at about 3-6.5% by weight.

A small amount of mineral oil may be required to compound the polymer microsphere effectively whilst maintaining the processing temperature below the expansion onset temperature of the polymer microspheres. Such formulations typically expand to densities in the range of 30-100 g/L when purged from the end of the injection mould machine extruder barrel at atmospheric pressure.

Injection moulding is advantageous over other moulding techniques for a variety of reasons, including a lower cycle time and improved process control.

The polymer entering a mould cavity in an injection moulding process typically freezes instantly on the surface of the tool, as said surface is significantly lower in temperature than the melt temperature of the polymer. The injection pressure continues to shear liquid polymer in the core of the part section across the solidified faces and the additional shear heat partially re-melts the solidified surfaces; creating a boundary layer in equilibrium due to the heat being conducted out through the tool and the additional heat energy being provided by shear. For the production of routine shaped (foamed) polymer articles (for light weighting purposes) and for which there may be tolerated a significant variance in the properties across the volume of the polymer this may not be particularly problematic.

However, in connection with the formation of foamed polymers in accordance with the present invention, this mechanism prevents the expansion of voids at the surface of the part being moulded, due to the almost instantaneous freezing of the polymer under high injection pressure which, at least for the case when polymer microspheres are used as the foaming or blowing agent, does not allow sufficient time for void formation.

The present invention addresses this problem by maintaining the polymer composition at a temperature to prevent the composition freezing during formation of the shaped article.

The barrel temperature of the injection moulding unit may be minimised and preferably is s the lower end of the conventional polymer composition processing temperature (≤200° C. for HDPE and PP for example). Typically, this allows for additional heat load, for example from shear forces during the injection moulding process and limits the maximum temperature that the foaming agent (e.g. polymer microspheres) is exposed to. For example, for HDPE, suitable barrel temperatures may be about 160-180° C. In order to prevent excessive heating of the melt and shear damage to the polymer microspheres (when present), high shear regions in the melt, for example caused by sharp corners and flow restrictions or non-smooth flow paths, may be reduced, minimised or avoided. Residence time in the barrel may be reduced in order to minimise degradation of the polymer microspheres. Back pressure may be maintained to prevent the pre-expansion of microspheres in the barrel.

The mould cavity or tool cavity may be evacuated by vacuum pressure before the shot is injected in order to reduce the cavity pressure and to reduce the resistance to foam flow and expansion due to pressure build up from trapped air. Vent plugs made from porous sintered metals, such as those manufactured by Mould and Die Solutions, South Africa or by Viewmold, China or CUMSA may be used. The shot volume may be tuned so that it possesses a volume which is smaller than the volume of the mould cavity in order to allow for expansion of the melt. The volume of the required shot may be calculated by multiplying the part volume with the ratio of required density to compound density. The correct shot volume can also be investigated iteratively by moulding smaller shot volumes until the correct part weight and density is achieved along with adequate mould filling.

For use in the method of the present invention, the injection speed may be reduced when compared with conventional injection moulding and a fill time of about 2 to about 11 seconds may be employed. The fill time may be dependent on the size and shape of the part. The design of the moulding tool may incorporate a hot runner system and hot tip nozzle gate. This ensures that there is no, or minimal, temperature or pressure drop in the material along the injection path before the cavity, thus allowing for lower injection pressures, prevention of the pre-expansion of any polymer microspheres before they enter the cavity, and eliminating cooling and solidification of the polymer melt along the tool surfaces of the sprue before it reaches the cavity.

The method in accordance with the present invention may be carried out by using a movable tool mechanism commonly referred to as a drop tool configuration. A drop tool comprises a part of the tool or mould cavity being movable (typically the movable component is chosen to be the core), whose position relative to the cavity in the injection moulding tool can be adjusted as part of the moulding cycle to change the volume of the cavity. The movement could also come from other parts of the tool; e.g. side action tools or retractable collars and sleeves being other examples. For example, a suitable arrangement comprises one face of a plate shaped cavity which can move relative to the opposite face of said cavity in order to change the section thickness of the cavity.

The polymer composition may be maintained at a temperature to prevent the polymer composition freezing during formation of the shaped article by ensuring for example that the tool cavity surface temperature is greater than the melting temperature of the polymer composition and/or greater than the expansion onset temperature of the foaming or blowing agent. For example, the use of Rapid Temperature Control (RTC) tooling allows for high tool temperatures during melt injection and rapid tool cooling to minimise cycle times. A shot of known volume (calculated as described above) may be inserted or injected into the tool cavity with the moveable tool part fully or substantially fully extended. The cavity volume may be at a minimum or close to minimum at this point and the position of the moveable tool part chosen so the cavity volume is similar to the unexpanded volume of the polymer composition. The shot is preferably injected at as high a speed and pressure as possible (whilst ensuring shear heating is maintained below the level it would damage the microspheres, e.g. polymer microspheres) in order to prevent pre-expansion of the foaming or blowing agent and to minimise temperature drop in the melt. After injection of the required shot volume, the injection pressure may be released and/or the valve gate of the tool closed to seal the cavity and the movable tool part fully or substantially fully retracted, thereby increasing the cavity volume and forming the cavity shape into the finished shape required of the shaped article. The reduction in pressure resulting from the increased cavity volume allows the foaming or blowing agent to expand to fill this new volume and, due to the hot tool surface, this expansion can occur through the entire part volume and this expansion is homogenous without the formation of solid skins. The tool is then rapidly cooled to allow for part solidification and subsequent removal from the tool in an economic cycle time.

Figure 5:
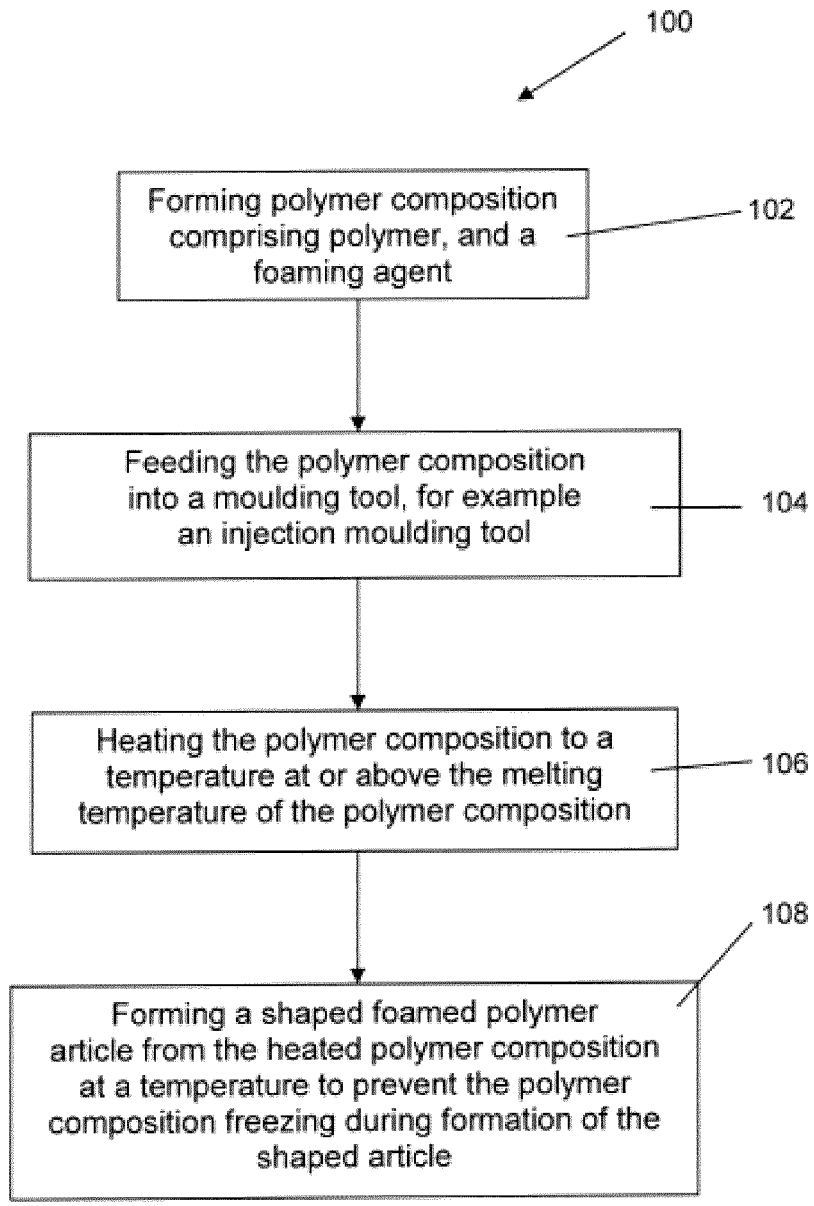
FIG. 5 shows a flow chart depicting one example of preparing a shaped foamed polymer article in accordance with a method of the present invention.

FIG. 5 shows a flow chart of a method (100) of preparing a shaped foamed polymer article according to the present invention. In a first step (102), a polymer composition is formed comprising a polymer, and a foaming or blowing agent, e.g. polymer microspheres. In a second step (104), the polymer composition is fed into a moulding tool, preferably the moulding tool is an injection moulding tool. In a third step (106), the polymer composition is heated to a temperature at or above the melting temperature of the polymer composition. In a fourth step (108), the heated polymer composition is formed into a shaped foamed polymer article and the polymer composition is maintained at a temperature to prevent the polymer composition from freezing until after the polymer composition has been formed in to the final shaped article. The heated polymer composition may be maintained at a desired temperature or temperature range by heating the moulding tool or tool cavity, or the internal surface(s) of the tool cavity.

Figure 6:
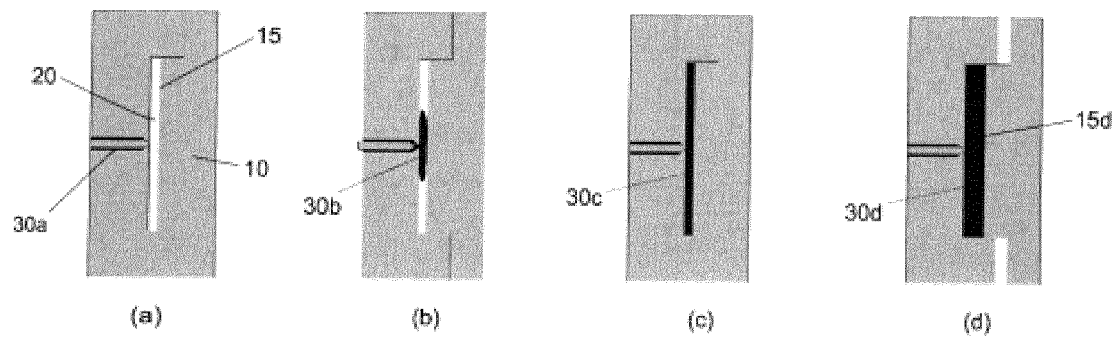
FIGS. 6a-6d show a method in accordance with the present invention comprising a series of steps where a polymer composition is processed in a tool cavity of an injection moulding tool.

In FIGS. 6a-6d, a sequence of steps is shown illustrating the injection of a polymer composition into a tool cavity of an injection moulding tool. In FIG. 6a, a tool cavity is illustrated generally at (10). The tool cavity (10) possesses a movable tool part, e.g. a movable plate (15). The surface of the tool cavity is heated to a high temperature, (typically using pulses of high pressure steam in an RTC tool configuration), i.e. >polymer composition melting temperature and >foaming agent activation temperature (e.g. the polymer microsphere expansion onset temperature). The movable tool part (15) is fully extended to give a cavity volume (indicated at 20) which is less than that required for the finished part. For example, if a 50% weight reduction is required to give a foam density half that of an un-foamed monolithic polymer, then the moveable tool part is set to give a cavity volume half that of the finished part.

Polymer composition is indicated at (30a), (30b), (30c), (30d). The polymer composition injected into the tool cavity (10) may be referred to as the shot. The shot volume is chosen to fully fill the reduced cavity volume (20). Once the required shot weight has been injected, the injection pressure is rapidly removed from the shot (now held within the cavity and indicated at (30b)). This is achieved most effectively by closing the valve gate of the tool. The movable part of the tool (15) is now fully retracted (indicated by 15d) to increase the cavity volume thus changing it from the smaller shot volume set during injection (FIG. 6a), to the larger cavity volume and geometry required from the finished part (FIG. 6d). This increase in cavity size reduces the pressure within the tool cavity. The shot is still liquid (owing to the tool surface being set to a higher temperature than the melt processing temperature of the polymer) and the reduction in pressure now allows the pressure within e.g. the polymer microspheres to overcome the viscosity of the polymer melt and expand, causing a foam formation which causes the liquid shot to fill and conform to the final cavity shape. The tool surface is now rapidly cooled, for example using cooling oil or high pressure cooling water with an RTC system.

The shaped foamed article formed in accordance with the present invention may be used in a range of applications.

Figure 4:
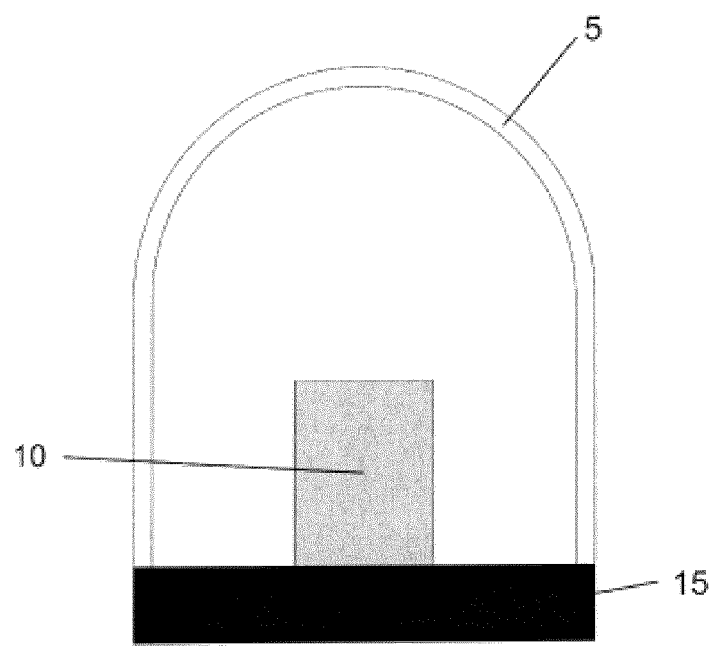
FIG. 4 shows a cross-section of a radome structure made from a polymer foam which was made in accordance with the present invention protecting an antenna system.

FIG. 4 is a schematic representation of a radome cross-section comprising a polymer foam (5) covering an antenna system (10) which is supported by a housing (15). In FIG. 4, the polymer foam (5) is made in accordance with the present invention and is in the form of providing the function of a radome. A radome is a structure placed over an antenna which protects the antenna from the physical environment outside of the enclosure formed by the radome and its housing. The radome may be used to cover the multi-layered article or product, e.g. when it is in the form of a (Luneburg) lens. The radome is RF transparent over the operating frequency range of the antenna equipment enclosed within it in order to allow electromagnetic energy to propagate through it in both directions with low levels of signal attenuation. The radome material, i.e. polymer foam (5) may possess an electrical section thickness (the combination of physical thickness and dielectric constant—or permittivity) which is of the order of half a wavelength in order to reduce the resonant absorption of the propagating signal. The present invention provides a low cost, high volume alternative to known techniques.

The shaped foamed polymer articles formed in accordance with the method of the invention may be suitable for use in RF applications such as; RF lenses (e.g. a Luneburg lens).

The person skilled in the art realizes that the present invention is by no means limited to the preferred embodiments described above. On the contrary, many modifications and variations are possible within the scope of the appended claims.

EXAMPLES

Example 1

Samples of TiO$_2$ were coated with silane in accordance with the following procedure.
  An aqueous solution of isopropyl alcohol was prepared and stirred for 5 minutes.
  Acid was added to bring the pH of the solution to the appropriate hydrolysis conditions.
  1.5 wt % silane (based on the weight of the TiO$_2$) was added to the solution and mixed at room temperature for 30 minutes.
  TiO$_2$ was added to the solution and mixed for 30 minutes at an increased temperature.
  The temperature was further increased and mixed for another 30 minutes.
  Any excess solvent was evaporated.
  The coated filler was cured in an oven at an elevated temperature for 1 hour.
  The silane used for coating the TiO$_2$ was as follows: methacryloxypropyltrimethoxy silane (A-174-NT, Silquest).

Example 2

In Example 2, the viscosity was measured on a Kinexus Ultra+(model no KNX2312). The sample heating was 200° C., the shear rate was 0-1.5 s$^{-1}$, the number of samples tested was 30, the duration of the experiment was 3 minutes, and the sweep was a linear shear rate.

A number of filled polymer compositions were prepared to investigate the effect of silane treatment on TiO$_2$ after compounding in HDPE. The silane used for coating the TiO$_2$ at 1.5 wt % was as follows: methacryloxypropyltrimethoxy silane (A-174-NT, Silquest).

TABLE 1

| Sample No | Coated Filler (vol %) | Polymer (vol %) | Coating agent | Lubricant (vol %) |
| --- | --- | --- | --- | --- |
| 1 | TiO$_2$ (45) | HDPE (55) | none | none |
| 2 | TiO$_2$ (47) | HDPE (51) | none | PE wax (2%) |
| 3 | TiO$_2$ (50) | HDPE (48) | A-174-NT | PE wax (2%) |
| 4 | TiO$_2$ (45) | HDPE (53) | none | PE wax (2%) |
| 5 | TiO$_2$ (50) | HDPE (48) | none | PE wax (2%) |

Figure 2:
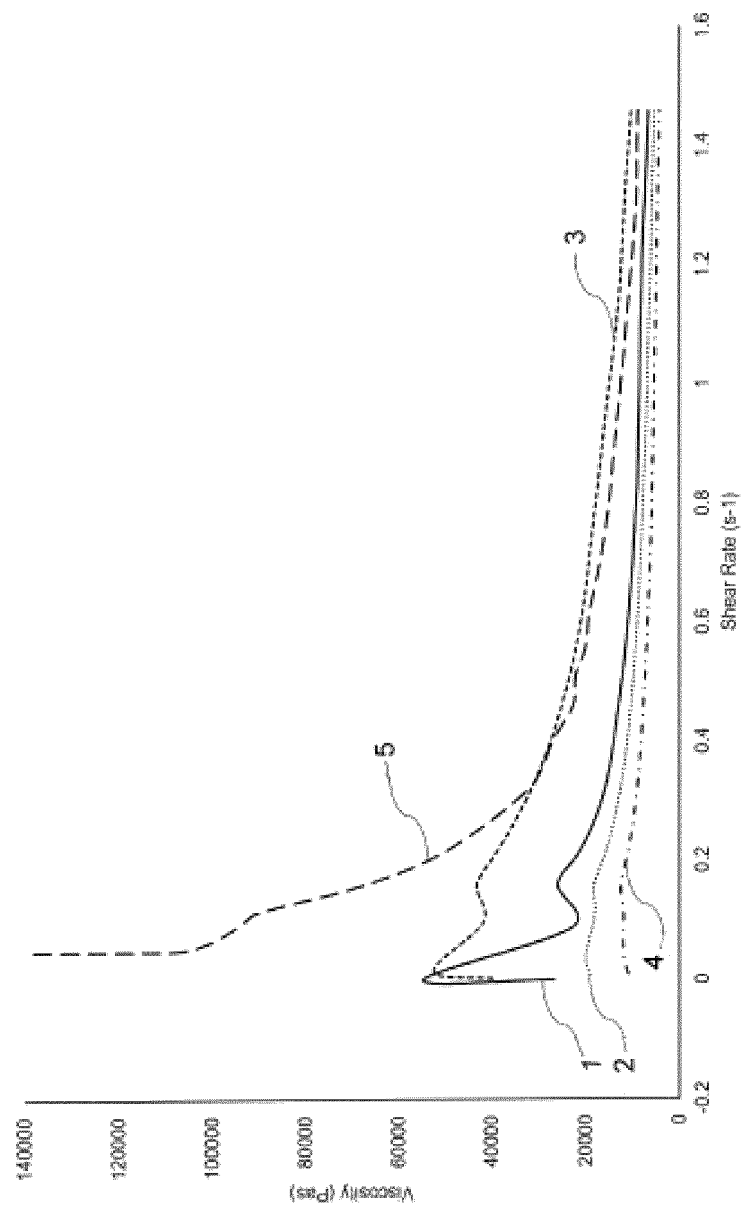
FIG. 2 shows results obtained in connection with Example 2.

The rheology characteristics are illustrated in FIG. 2. The permittivity and loss tangent are reported in Table 2 below.

TABLE 2

| Sample No | Permittivity | Loss Tangent |
| --- | --- | --- |
| 1 | 14.30 | 0.0015 |
| 2 | 15.44 | 0.0016 |
| 3 | 14.74 | 0.0022 |
| 4 | 15.18 | 0.001 |
| 5 | 18.14 | 0.0038 |

Example 3

Figure 3:
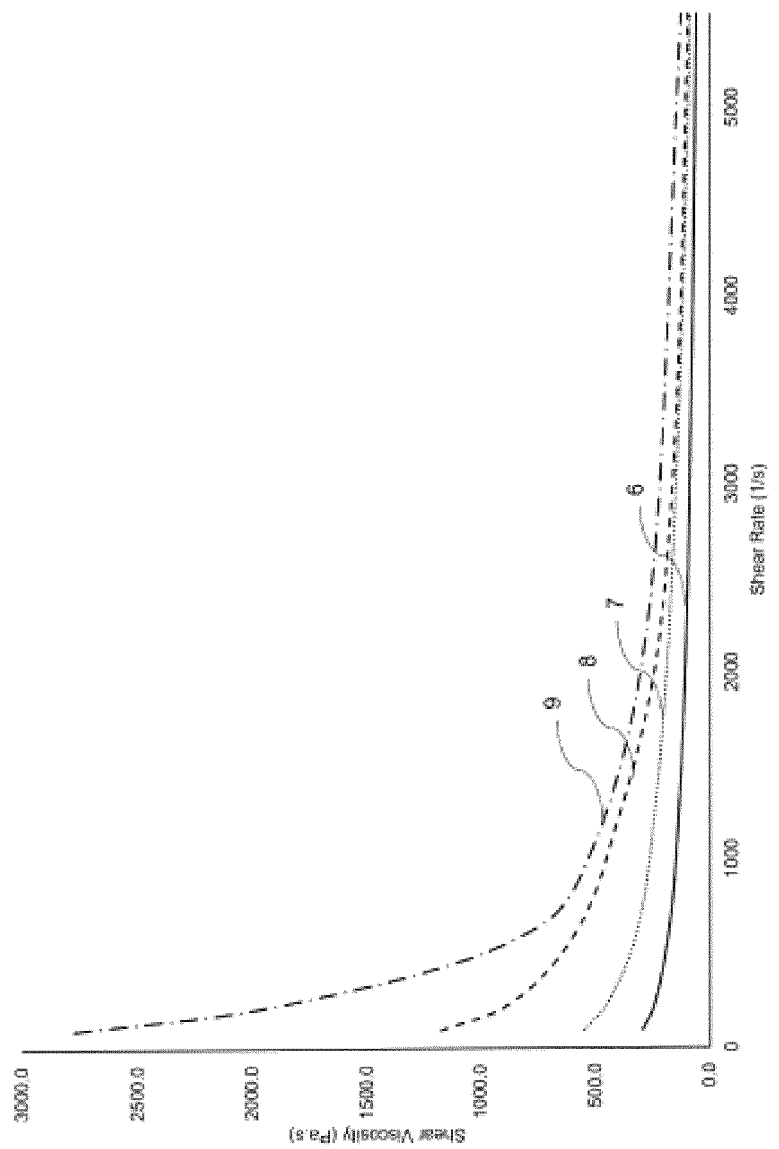
FIG. 3 shows results obtained in connection with Example 3.

In Example 3, a number of samples were prepared as set out in accordance with Table 3. The level of silane coating was 1.5 wt %. The rheology characteristics are illustrated in FIG. 3. The sample heating was 200° C. and the shear rate was 0-5520 s$^{-1}$. In Example 3, the viscosity was measured on a Porpoise P9 advanced twin bore capillary extrusion rheometer in general accordance of ASTM D3835 (ISO 11443).

TABLE 3

| Sample No | Coated Filler (vol %) | Polymer (vol %) | Coating agent | Lubricant (vol %) |
| --- | --- | --- | --- | --- |
| 6 | None | HDPE (100) | none | None |
| 7 | TiO$_2$ (16) | HDPE (82) | A-174-NT | PE Wax (2%) |
| 8 | TiO$_2$ (32) | HDPE (66) | A-174-NT | PE Wax (2%) |
| 9 | TiO$_2$ (48) | HDPE (50) | A-174-NT | PE Wax (2%) |

Example 4

The part assembly geometry shown in FIG. 9 (100) was welded using the tool geometry shown in FIG. 9. The parts were constructed from compounds of HDPE and titanium dioxide varying from 18.6% to 1.7% by volume between different parts of the assembly. Compounds of alternate parts in the assembly structure were dyed using a small amount of chrome oxide colourant to provide optical contrast for post welding inspection and injection moulded on a Travin TP1 injection moulding press as separate parts prior to assembly. The parts were assembled and positioned in the tool cavity shown of tool half (92) by hand. The bore of tool half (91) was then positioned over the piston of tool half (92) and 8 M8 bolts tightened with a torque wrench to a torque value of 23 N/m to secure the two tool halves together. The tool assembly was then placed in a fan assisted box oven at a temperature of 160° C. for 4.5 hours. The assembly was removed from the oven after this time and allowed to cool in air for 60 minutes before being disassembled. Upon removal of tool half (91) from tool half (92), the welded assembly was revealed and all parts were found to be fully bonded to one another but not to the cavity surfaces, from which they had shrunk back from during cooling. Measurement of the diameter of the welded assembly at different angles showed the shaped article was concentric within a tolerance of +/−50 µm. The welded assembly was cut in half using a woodworking band saw and polished to the half diameter plane using a woodworking sanding wheel. The polished surface was then inspected using an optical scanner and the cross section geometry of the assembly laid over this image using CorelDraw 2D drawing software. The geometry was found to be within +/−200 microns of the nominal assembly geometry at all interfaces and the discrepancies seen were attributable to tolerance in the assembled moulded parts at the injection moulding stage due to polymer shrinkage.

The person skilled in the art realizes that the present invention is by no means limited to the preferred embodiments described above. On the contrary, many modifications and variations are possible within the scope of the appended claims.

Additionally, variations to the disclosed embodiments can be understood and effectuated by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A multi-layered radio frequency (RF) lens article or RF lens product comprising at least two layers, wherein:
   at least one of the at least two layers is a polymer composition comprising a polymer and a filler material, wherein the filler material comprises titanium dioxide ($TiO_2$) and the polymer is selected from any one or more of: high density polyethylene (HDPE), cyclic olefin copolymer (COC), polyphenylene ether (PPE), polypropylene (PP), and fluorinated ethylene propylene (FEP); and
   another one of the at least two layers is a foamed polymer layer, wherein the foamed polymer layer:
   is a HDPE or PP foam layer;
   is shaped to have doubly curved surfaces or to have parts of continuously varying section thickness; and
   comprises voids that are distributed throughout the entirety of the HDPE or PP such that it has homogenous structure and non-varying density.

2. The multi-layered RF lens article or RF lens product according to claim 1, wherein the titanium dioxide is present in an amount of at least 20 vol %, or at least 30 vol %, or at least 40 vol %, or at least 50 vol %, or at least 60 vol % based on the total volume of the polymer composition.

3. The multi-layered RF lens article or RF lens product according to claim 1, wherein the titanium dioxide is not surface treated.

4. The multi-layered RF lens article or RF lens product according to claim 1, wherein the titanium dioxide is surface treated titanium dioxide.

5. The multi-layered RF lens article or RF lens product according to claim 4, wherein the titanium dioxide is surface treated with a silane.

6. The multi-layered RF lens article or RF lens product according to claim 5, wherein the titanium dioxide is surface treated with a silane and wherein the silane is selected from methacryl silanes, for example, a methacryloxy functional trimethoxy silane such as (gamma)-methacryloxypropyltrimethoxy silane.

7. The multi-layered RF lens article or RF lens product according to claim 6, wherein the titanium dioxide is surface treated with a silane and the silane is selected from methacryloxypropyltrimethoxy silane.

8. The multi-layered RF lens article or RF lens product according to claim 4, wherein the titanium dioxide is surface treated in an amount of about 0.9 wt % to about 2 wt %, based on the weight of the surface treated titanium dioxide.

9. The multi-layered RF lens article or RF lens product according to claim 4, wherein the surface treated titanium dioxide is either surface treated or coated over a part of its surface or over the entirety of its surface.

10. The multi-layered RF lens article or RF lens product according to claim 4, wherein the titanium dioxide is surface treated or coated with a coating agent.

11. The multi-layered RF lens article or RF lens product according to claim 1, wherein the titanium dioxide comprises, consists of, or consists essentially of titanium dioxide in the rutile form.

12. The multi-layered RF lens article or RF lens product according to claim 1, wherein the polymer is cross-linked.

13. The multi-layered RF lens article or RF lens product according to claim 1, wherein the polymer composition also comprises a lubricant, optionally wherein the lubricant is present in an amount of about 0.5% to about 5% by weight based on the total weight of the polymer composition.

14. The multi-layered RF lens article or RF lens product according to claim 13 wherein the lubricant is selected from one or more of waxes, optionally wherein the lubricant is selected from a polyolefin wax, for example polyethylene wax.

15. The multi-layered RF lens article or RF lens product according to claim 1, wherein variance of the permittivity varies by 0% to about 5% or up to about 2% or up to or less than 0.5% across the entirety of the foamed polymer layer.

16. The multi-layered RF lens article or RF lens product according to claim 15, wherein the foamed polymer layer is an outer layer.

17. The multi-layered RF lens article or RF lens product according to claim 1 comprising further layers, and wherein each of the layers of the multi-layered RF article or RF product has a different dielectric constant or a different permittivity and further wherein at least some of said layers is the polymer composition in accordance with any one of the previous claims.

18. The multi-layered RF lens article or RF lens product according to claim 17, wherein only one of the layers is a foamed polymer layer.

19. The multi-layered RF lens article or RF lens product according to claim 17, wherein at least one of the layers is a second polymer composition comprising a polymer, a filler material, and wherein the filler material is other than $TiO_2$.

* * * * *